(12) United States Patent
Schlesiger et al.

(10) Patent No.: US 8,068,958 B2
(45) Date of Patent: Nov. 29, 2011

(54) METHOD FOR MONITORING THE ADJUSTMENT MOVEMENT OF A COMPONENT DRIVEN BY A DRIVE DEVICE

(75) Inventors: Markus Schlesiger, Hallstadt (DE); Sven Baumann, Breitenbach (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 1170 days.

(21) Appl. No.: 10/591,357

(22) PCT Filed: Mar. 2, 2005

(86) PCT No.: PCT/DE2005/000360
§ 371 (c)(1), (2), (4) Date: Sep. 1, 2006

(87) PCT Pub. No.: WO2005/086312
PCT Pub. Date: Sep. 15, 2005

(65) Prior Publication Data
US 2007/0276567 A1    Nov. 29, 2007

(30) Foreign Application Priority Data
Mar. 2, 2004 (DE) .......................... 10 2004 011 015

(51) Int. Cl.
G05D 3/00 (2006.01)
G06F 7/00 (2006.01)
(52) U.S. Cl. ................................. 701/49; 701/1; 701/36
(58) Field of Classification Search ............ 701/36, 701/49; 318/466–469, 626, 437
See application file for complete search history.

(56) References Cited

U.S. PATENT DOCUMENTS

| | | | |
|---|---|---|---|
| 5,410,477 A | 4/1995 | Ishii et al. | |
| 5,487,130 A * | 1/1996 | Ichimori et al. | ............... 706/61 |
| 5,588,173 A | 12/1996 | Battlogg | |
| 5,828,812 A * | 10/1998 | Khan et al. | ........................ 706/2 |
| 5,982,124 A * | 11/1999 | Wang | ........................... 318/466 |

(Continued)

FOREIGN PATENT DOCUMENTS

DE    40 20 351 A1    1/1992

(Continued)

OTHER PUBLICATIONS

English translation of International Preliminary Report on Patentability dated Oct. 4, 2006, corresponding to PCT/DE2005/000360.

(Continued)

*Primary Examiner* — Khoi Tran
*Assistant Examiner* — Ian Jen
(74) *Attorney, Agent, or Firm* — Christie, Parker & Hale, LLP

(57) ABSTRACT

A method for monitoring the adjustment movement of a component, in particular a window pane or a sunroof in motor vehicles, which is driven by a drive device and can be adjusted in a translatory or rotary fashion. A plurality of input signals which can be derived from the drive device and which represent a deceleration of the adjustment movement of the drive device are input at input neurons of an input layer of a neural network with at least one hidden layer having hidden neurons. Said network outputting, at at least one output neuron of an output layer, an output value which corresponds to the adjusting force or to a trapped state or nontrapped state.

23 Claims, 17 Drawing Sheets

U.S. PATENT DOCUMENTS

| | | |
|---|---|---|
| 5,991,675 A | 11/1999 | Asanuma |
| 6,208,981 B1 | 3/2001 | Graf et al. |
| 6,330,553 B1 * | 12/2001 | Uchikawa et al. ............. 706/2 |
| 6,573,676 B1 | 6/2003 | Klesing |
| 6,630,808 B1 * | 10/2003 | Kliffken et al. ............. 318/466 |
| 6,788,016 B2 * | 9/2004 | Whinnery ............. 318/468 |

FOREIGN PATENT DOCUMENTS

| | | |
|---|---|---|
| DE | 42 09 150 A1 | 9/1992 |
| DE | 44 19 317 A1 | 12/1994 |
| DE | 195 27 323 A1 | 1/1997 |
| DE | 197 54 703 A1 | 6/1999 |
| DE | 198 40 164 A1 | 3/2000 |
| DE | 101 15 045 A1 | 10/2002 |
| DE | 101 96 629 T1 | 10/2003 |
| EP | 0 521 729 B1 | 1/1993 |
| EP | 0 631 546 B1 | 1/1995 |
| WO | WO 02/27132 A1 | 4/2002 |
| WO | WO 03/063318 A1 | 7/2003 |

OTHER PUBLICATIONS

International Search Report, dated Jun. 22, 2005, corresponding to PCT/DE2005/000360.

* cited by examiner

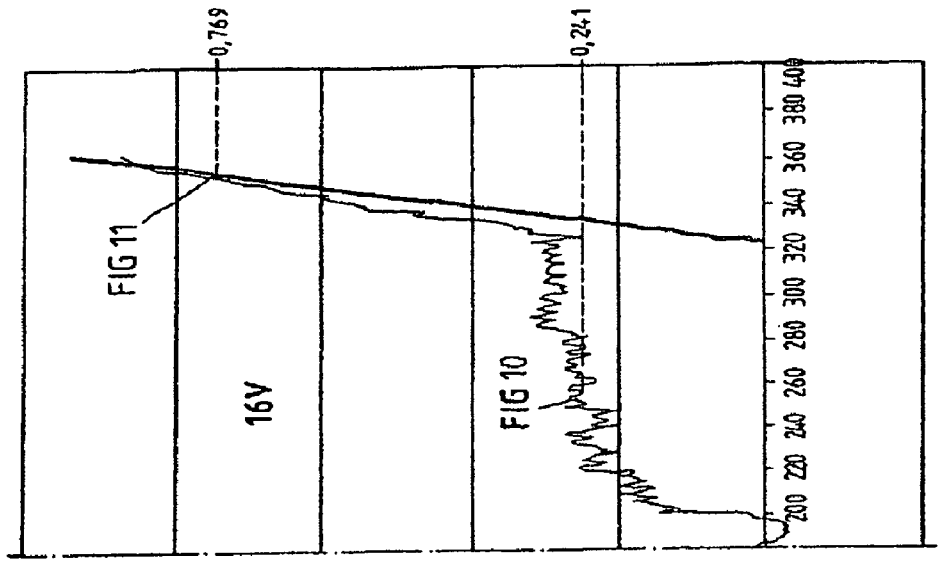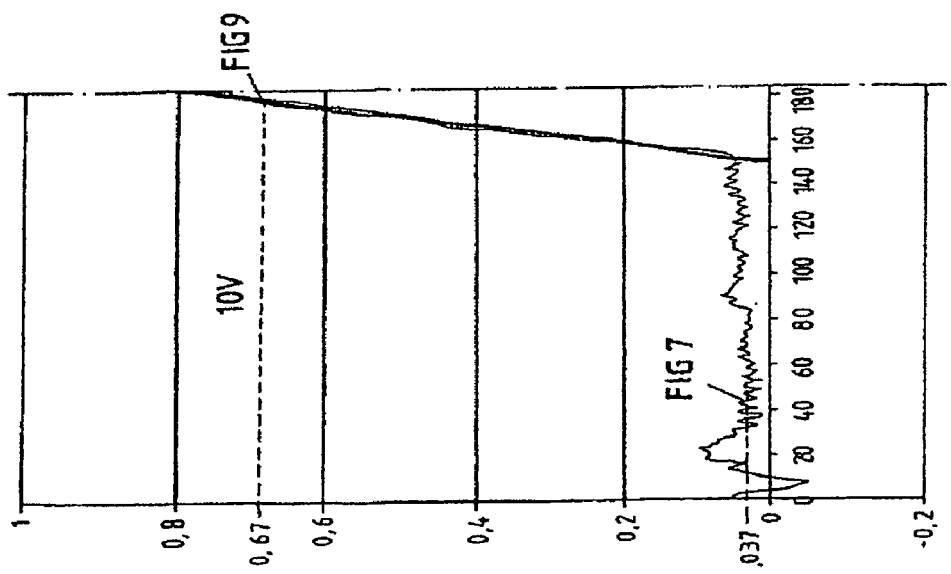

METHOD FOR MONITORING THE ADJUSTMENT MOVEMENT OF A COMPONENT DRIVEN BY A DRIVE DEVICE

CROSS-REFERENCE TO A RELATED APPLICATION

This application is a National Phase Patent Application of International Patent Application Number PCT/DE2005/000360, filed on Mar. 2, 2005, which claims priority of German Patent Application Number 10 2004 011 015.8, filed on Mar. 2, 2004.

BACKGROUND

The invention relates to a method for monitoring the adjustment movement of a component which is driven by a drive device and is adjustable in a translatory or rotary fashion, in particular a method for determining the force with which a drive device adjusts a component or traps an object which is located in the adjustment travel of the component.

DE 198 40 164 A1 discloses a method for adjusting a component which can be moved in a translatory fashion between two positions and in which the instantaneous force effect on the component which can be moved in a translatory fashion from the period length of a drive motor which is part of a drive device which adjusts the component which can be adjusted in a translatory fashion is calculated from force change values which are calculated from changes in the rotational speed of the drive motor, and from which summed force change values and force change values which have been weighted by means of equation systems which have been created by means of a mathematical model of the entire adjustment device including the drive are determined, said force change values depending exclusively on the behavior of the drive motor. The instantaneous force effect on the component which can be moved in a translatory fashion is used as a criterion for the switching off or reversal of the drive motor, the value of an upper threshold value being used instead of the value for the change in rotational speed in the calculation of the force change values for each value for a change in rotational speed which exceeds said upper threshold value.

In order to limit the number of physical variables to be sensed and the frequency of the samplings of the physical variables, the period length of the rotations of the drive motor is sensed by means of a magnet wheel and two Hall sensors. Fine resolution monitoring of the trapping prevention criteria is aimed at on the basis of the sensed period length in conjunction with various parameters sensed empirically or by measuring means, by extrapolating the sensed period length.

For this purpose, in order to determine the instantaneous force effect on the component which is moved in a translatory fashion, the measured values of the period length which are available only on a period basis are extrapolated, the parameters which are used during the extrapolation formula modulating the entire system of the drive device and being determined by means of the spring stiffness, attenuation and friction values of the entire system. As a result, spectral components of the period time profile which originate from vibrations are evaluated more weakly than those which originate from a case of trapping. From the estimated values which are determined for the period length in this way, the change in rotational speed is then estimated at a time with respect to the preceding time using a motor voltage filter and a displacement profile filter in order to eliminate the influences of the motor voltage and the position of the movable vehicle component on the motor speed.

The to eliminate the motor voltage and position of the component which can be moved in a translatory fashion on the motor speed model, inter alia, the dynamic behavior of the drive motor when there are changes in voltage. A further correction is performed by the estimated changes in rotational speed being compared with a fixed, chronologically constant lower limit. If the estimated changes in rotational speed exceed this lower limit, they are multiplied by a proportionality factor which represents the steepness of the motor characteristic curve of the drive motor.

DE 40 20 351 C2 discloses a method for controlling a window pane of a motor vehicle in which a correction method is applied in order to derive a trapping prevention criterion which is intended to prevent excessively early response of a trapping prevention device. For this purpose, a first sensor device supplies control electronics with signals which are associated in terms of their origin with the window pane and the drive device which moves the window pane, these signals being the voltage of the onboard electrical system, the window lifter speed, the torque of the drive, the weight of the window pane etc., while a second sensor element supplies the control electronics with signals which are not associated in terms of their origin with the window pane and the drive device, specifically with acceleration forces which act on the vehicle bodywork. In order to prevent the trapping prevention device being incorrectly switched off or reversed, the signals of the second sensor element are used as a basic level and the signals of the first sensor device are evaluated in terms of safety criteria.

In the known method, use is made of a relative detection of a vehicle body by means of a rise in the period length, that is to say the force changes at successive time intervals are compared with one another, as a result of which the run up of the component which can be moved in a translatory fashion can be differentiated only with difficulty from the trapping of an object in the adjustment travel of the component which can be moved in a translatory fashion.

When there are jumps in voltage in the onboard electrical system of a motor vehicle and when sections of poor road are traveled over, the known methods bring about overcompensation of the interference variables, which leads to high offsets with very high forces so that the permissible trapping forces are exceeded. A further disadvantage of the known methods is that the force acting on the component which can be moved in a translatory fashion can be detected only when there is a rise in the period length, which leads to high forces when there is a degression in the period length, that is to say when the period length decreases, for example owing to ease of movement of the component which can be moved in a translatory fashion, which also leads to increased trapping forces.

Changes in the profile of the adjustment travel of the component which can be moved in a translatory fashion which are due to ageing and wear are compensated in the known method by parameter changes, which entails readjustment of the control algorithm and a correspondingly complex control method.

Finally, the known methods are dependent on the selection of a specific number of different parameters which are decisive for the switching off and reversing of the component which can be moved in a translatory fashion, which entails corresponding complexity of sensor systems and control equipment when there is a relatively large number of parameters.

DE 101 96 629 T1 discloses the use of a neural network in a sensor system for a driven closing system and a method for preventing a driven closing system from closing according to requirements, in which method the sensor system detects objects by means of a proximity sensor before trapping occurs. However, the problems which occur with the known methods which are specified above relate to the sensing of signals of the drive device which makes evaluation and fault correction particularly difficult owing to the variables which influence one another.

SUMMARY

The object of the present invention is to specify a method for monitoring the adjustment movement of a component which is driven by a drive device and can be adjusted in a translatory or rotary fashion, said method taking into account the different influencing variables on the adjustment, trapping or reversing force, being capable of being adapted automatically to changes in the influencing variables and having a high degree of flexibility in terms of the taking into account of the influencing variables which influence a trapping prevention means.

The solution according to the invention proposes a method for monitoring the adjustment movement of a component which is driven by a drive device and can be adjusted in a translatory or rotary fashion, in particular by determining an adjustment, trapping or reversing force, with settable sensitivity, said method taking into account the different influencing variables which influence the adjustment, trapping or reversing force, being capable of being automatically adapted to changes in the influencing variables and having a high degree of flexibility in terms of the taking into account of the influencing variables which influence a trapping prevention means.

In particular, the solution according to the invention ensures that
  the sensitivity of the determination of force can be set at low spring constants;
  changes in the supply voltage do not lead to large fluctuations in force, and in particular jumps in voltage do not lead to reversal of the adjustment movement or to overcompensation;
  a large voltage range of, for example, 8-17 V is ensured;
  harmonics of a vehicle body during acceleration are detected in good time;
  changes in the adjustment travel of the adjustable component are sensed continuously;
  the switching off force of the trapping prevention means can be set continuously;
  the signals can be sensed in any desired fashion, and
  simple adaptation to customer-specific demands is possible.

The solution according to the invention utilizes the advantages of a neural network in the determination of an adjustment, trapping or reversing force, specifically
  the capability of learning automatically from given data without having to be explicitly programmed to do so,
  the detection of stored patterns even if the input pattern in the learning phase is incomplete or a part of it is faulty, and
  the ability to deduce unlearnt problems from learnt ones.

A deceleration of the adjustment movement of the drive device is preferably determined by changing the period length and/or the motor current and/or the motor voltage of a drive motor of the drive device.

The method according to the invention makes use of direct or indirect detection of a case of trapping by increasing the period length or the motor current taking into account the motor voltage of the drive motor of the drive device or by logically combining same or all of the signals. While the adjustable component is stopped or reversed in the case of trapping, which is preferably determined at various spring constants of, for example, 2 N/mm, 10 N/mm, 20 N/mm and 65 N/mm with a 4 mm rod, a jump in voltage, running of the adjustable component into a seal or some other difficulty of movement caused by the weather in the adjustment travel of the adjustable component as well as the running up of the drive device leads to a continuation of the adjustment movement.

Whereas in many of the known methods additional sensors such as, for example, proximity sensors, acceleration sensors and the like are used, in the solution according to the invention the period length and/or the motor current and/or the motor voltage are evaluated and thus without the additional expenditure in terms of manufacture incurred by the installation of corresponding sensors in conjunction with the device for evaluating the sensor signals with a suitable algorithm which does not react, or only reacts insufficiently, to many cases of trapping.

The input signals which can be derived from the drive device can optionally be output in parallel, i.e. simultaneously, or in series, for example using the multiplex method, to the input neurons of the input layer of the neural network.

So that the neural network is capable of learning, the inputs of the input layer, of the hidden layer and of the output layer as well as the connections of the input layer to the at least one hidden layer, the connections of the plurality of hidden layers to one another and the connection of a hidden layer to the output layer have differing weightings, as a result of which the connections between the individual layers have differing strengths.

Furthermore, the hidden neurons of the at least one hidden layer and the at least one neuron of the output layer have a constant threshold value or bias which shifts the output of the transfer functions of the neurons into a constant region. In this context, the bias and the weightings are constants which in the application or a series use are no longer changed or relearnt. They are determined once before the series use and stored, for example, in an EEPROM. If weak points became apparent in the algorithm, it can be improved by setting new parameters, for example by relearning. However, both the weightings and the bias remain in the application.

In a learning phase, random weightings are assigned to the input neurons, hidden neurons and/or output neurons of the neural network, various input patterns which are applied to the input neurons are predefined and the associated at least one output value is calculated, and the weightings and/or the threshold value are changed as a function of the difference between the at least one output value and at least one setpoint output value. In this context, the degree of change in the weightings depends on the size of the difference between the at least one output value and the at least one setpoint output value.

The measurement of the output value is preferably carried out with a clip-on force measuring instrument at different spring constants, for example at 2 N/mm and 20 N/mm, the clip-on measuring instrument outputting the measured output value in a way which is analogous to the input values.

The motor period and/or the motor current and/or the motor voltage of the drive motor are input into the input neurons as input signals in a way corresponding to the direct or indirect signal acquisition with which the braking of the drive device is determined by a rise in the period length and/or the power drain of a drive motor of the drive device.

An adaptation period which specifies the period calculated for a predefined reference voltage and which is associated with the position of a reference distance stored in the learning phase is input into the input neurons as an additional input signal.

In the learning phase, the adaptation period can be calculated in a smaller neural network than that used in the application, the adaptation period being averaged in that the neural network calculates a new adaptation period at each full rotation of the drive motor or in 4 quarter periods of the drive rotor, said new adaptation period being made available at the next adjustment movement as an adaptation period.

In one embodiment of the invention, the input values of the input neurons are composed of the values of an adaptation profile of the component which can be adjusted, the values of an adaptation period when the component which can be adjusted is adjusted, a run up flag, the output values of a shift register for voltage values of the drive motor, the output values of a shift register for period values, the external temperature, a speed signal, an oscillation flag, and a preceding output value, while the force which is determined by neural means is output as an output value of an output neuron.

In the learning phase of the neural network, input patterns are applied to the input neurons and the force values which are output by the at least one output neuron are selected and/or predefined as a function of the desired sensitivity of the system at low spring constants. Here, the learnt portion in the learning phase of the neural network is composed, in particular, of the adaptation period which is determined anew in the application after each pass.

According to a further feature of the invention, the learning phase takes place in a vehicle before the operational application, while the weightings of the neural network which are determined in the learning phase are defined during the operational application.

The processing of absolute values requires, on the one hand, correction curves in order to determine the behavior and absolute output values, for example, of a drive system at different parameters, which leads to considerable inaccuracies, and, on the other hand, requires a large number of input neurons in order to take into account sufficiently the various influencing factors, which in turn means a considerable computing power of the microprocessor which is used to model a neural network. In order to avoid both disadvantages, in one development of the invention an adaptation device is used to determine signals of the drive device which are standardized to a reference value, and for outputting adaptation values to the input layer of the neural network.

The adaptation device outputs the adaptation values to input neurons as an additional input signal as a function of the respective position of the component which can be adjusted in a translatory or rotary fashion.

The adaptation device can optionally be composed of a model of the drive device, a fuzzy system, a mathematical model with a genetically generated algorithm, but in particular also of a neural adaptation network, to whose input neurons at least one signal of the drive device is applied and whose at least one output neuron outputs the position-dependent adaptation values to the neural network.

In order to determine the behavior of the drive device with different motor voltages of the drive motor, the respective motor voltage is referred to a reference voltage, in which case the data—made available to the neural network by the neural adaptation network—of the period of the associated torque is referred to the reference voltage so that the reference curve which is calibrated to the reference voltage is always correctly calculated for different torques. In this context, the periods or the sum are supplied as input data of the neural adaptation network over a plurality of periods and the associated motor voltage, and the neural adaptation network then during the course indirectly determines the respective torque and makes available the associated period as an input value for the reference voltage to the neural network which determines the trapping, adjustment or excess force.

In order to increase further the accuracy when determining the respective adjusting force of the drive device by means of the neural network it is possible to apply additional parameters such as the ambient temperature, climatic data or the temperature and the cooling behavior of the drive motor of the drive device to the input neurons of the neural adaptation network.

Since algorithms used hitherto for detecting a trapped state are very sensitive at low spring constants in order to bring about low trapping forces at high spring constants, low forces at low spring constants frequently give rise to faulty reversal of the drive motor.

In order to avoid faulty reversal of the drive motor, for example owing to changes in the adjusting force of the window lifter system or changes in the drive motor, according to a further feature of the invention the drive motor is stopped or reversed as a function of the output value of the neural network and the spring constant of the drive device. In this context, the logic combination of the spring constant of the drive device with the output value of the neural network can be carried out by means of a logic circuit, a mathematical model with an algorithm or by means of a neural logic network.

Accordingly, the difference in rotational speed at different periods of the drive motor is utilized to differentiate high spring constants from low spring constants. The decision on a trapped state is accordingly taken as a function of the output value of the neural network which corresponds to the adjusting force and the spring constant which is determined from the difference in rotational speed.

In order to logically combine the spring constant of the drive device with the output value of the neural network, the rotational speed of the drive motor is sensed, and the difference in rotational speed between two periods is formed and logically combined with the output value of the neural network in such a way that when a first switch-off threshold value of the output value of the neural network and a difference in rotational speed which is smaller than a predefined threshold value for the difference in rotational speed is exceeded, the drive motor is stopped or reversed up to the end of the adjustment movement only if the output value of the neural network exceeds a second switch-off threshold value which is greater than the first switch-off threshold value, when a first switch-off threshold value of the output value of the neural network and a difference in rotational speed which is greater than a predefined threshold value for the difference in rotational speed are exceeded, the drive motor is stopped or reversed, or when the second switch-off threshold value is exceeded the drive motor is stopped or reversed irrespective of the difference in rotational speed.

When the first switch-off threshold value of the output value of the neural network and a difference in rotational speed which is smaller than a predefined threshold value for the difference in rotational speed are exceeded, stopping or reversing of the drive motor are preferably blocked even if the difference in rotational speed ensuring the further adjustment movement of the drive device is greater than the predefined threshold value for the difference in rotational speed.

Neural networks are used in the prior art in control devices for adjustment devices of a motor vehicle component.

Motor vehicle components which are possible here are basically all motor vehicle components which are designed to be adjustable by motor. These are in particular motor vehicle components whose adjustment travel is designed such that there is a possibility of obstacles becoming trapped between the motor vehicle component and other components of the motor vehicle. These are, in particular, window panes, sliding doors, seat belt prepositioners and motor vehicle seats.

Known control devices are designed and configured to evaluate measured variables in an electronic device with the neural network and for use for controlling the adjustment device.

Such measured variables comprise all the parameters which are conceivable in conjunction with the motor vehicle and its components. These are in particular acceleration forces acting on the motor vehicle, the speed of the motor vehicle, the adjustment speed and the adjusting force of the adjustment device or its power drain.

As already stated, the weightings of the neural network constitute essential parameters for the function of the networks. Any connection between two neurons is characterized by such a weighting which is usually provided in the form of a numerical factor. An input signal which occurs at a neuron is multiplied in each case by the associated weightings of the corresponding connections to the adjacent neurons. The optimum combination of a multiplicity of weightings which are necessary for smooth functioning of the neural network can be determined in a so-called learning process. This defined quantity of weightings is also referred to as a set of weightings.

Once the set of weightings has been learnt, it can be stored in a storage element which is assigned to the neural network.

Such a learning process simulates a multiplicity of states of a motor vehicle and its components which can occur during the use of the motor vehicle. It is self-evident that a set of weightings which is determined in this way for the neural network cannot be equally compatible with all the conceivable states of the motor vehicle and its components.

For this reason, complex electronic filter circuits are frequently used to avoid the incorrect behavior of the control device in a number of states of the motor vehicle and/or of the adjustment device. These filter circuits however tend in some cases to overcompensate or react unreliably.

This gives rise to the object of presenting a control device of the type described above which functions as reliably as possible in a large number of different states of a motor vehicle and of its components while being easy and cost effective to manufacture.

In order to achieve this object, a storage unit which is assigned to the neural network which has at least two sets of stored weightings for the neural network is provided. Each set of weightings is assigned to a state of the motor vehicle and/or a state of the adjustment device, while the neural network operates as a function of the state of the motor vehicle and/or as a function of the state of the adjustment device with the respectively assigned set of weightings.

Since a specific set of weightings for the neural network is assigned to the respective state or the respective state combination, there is no need to use electronic filters. At the same time, the reliability of the control device is increased.

The feature of the states of the motor vehicle and its components, such as for example the control device and the adjustment device assigned to it, includes, in particular, the speed of the vehicle, acceleration forces which differ from the direction of travel of the vehicle and which are characteristic, for example, of a section of poor road, fluctuations in the voltage of the onboard electrical system, the running up of a motor which is assigned to the adjustment device, difficulty of movement of the adjustment device, expressed through characteristic changes in the power drain over the distance covered or the time, and the slamming of a motor vehicle door.

In particular, fluctuating voltage levels of the onboard electrical system lead to a change in the supply voltage of the adjustment device over time. This presents the risk of these changes in time being interpreted incorrectly by evaluation electronics, for example with respect to the electronic and/or mechanical parameters of the adjustment device.

The invention makes it possible to provide assigned sets of weightings for the neural network of the control device which are adapted specially for selected states or state combinations. This multiplicity of sets of weighting are stored in a storage unit assigned to the electronic device and are sufficiently quickly available to the neural network when the respective state or the state combination arises.

The neural network is preferably configured and designed in such a way that it evaluates the measured variables in such a way that a trapping prevention means is ensured for obstacles which are trapped in the adjustment travel of the motor vehicle component. That is to say the electronic device of the control device comprises a trapping prevention system for obstacles in the adjustment travel of the moved motor vehicle component.

It is advantageous if the different sets of weightings each implement different sensitivities of the adjustment device with respect to the detection of obstacles which are trapped in the adjustment travel of the motor vehicle component. As a result, the trapping prevention system is given different response thresholds as a function of the determined spring constant of the moved motor vehicle component. For example, in the motor vehicle state of traveling over a section of poor road or the motor vehicle state of the slamming of a motor vehicle door it is advantageous if the set of weightings used in an adjustment device which is configured as a window lifter device is configured in such a way that detected spring constants above a threshold value of 20 N/mm are gated out. This can be implemented, for example, by the response threshold of the trapping prevention system being significantly increased for spring constants above 20 N/mm.

The gating out of relatively high spring constants which is achieved in this way leads to a situation in which, for example in a window lifter device, the cases of faulty stopping or reversal of the window pane are significantly reduced.

Of course, the sets of weightings of the neural network can be configured in such a way that spring constant threshold values other than 20 N/mm are set. In this way it is possible to make adaptations to the regionally different legal requirements which are to be respectively met.

The electronic device is preferably configured in such a way that the sets of weightings can easily be replaced or amended. One way of amending the sets of weightings is so-called "learning". Here, the input measured variables of specific states, for example of typical sections of poor road, are fed in to the neural network. In this process, the weightings are varied until the desired output signal is present.

One embodiment of the control device comprises an electronic device with at least one interface for determining the states of the motor vehicle device and/or adjustment device. These interfaces are usually configured as bus nodes of a CAN (Controller Area Network) or as a LIN (Local Interconnect Network) bus system.

BRIEF DESCRIPTION OF THE DRAWINGS

Further features and advantages of the invention will be explained in more detail below using the exemplary embodiments illustrated in the drawings, in which:

FIGS. 12A and 12B are illustrations of the learning process plotted over time, for predefined input patterns of the networks according to FIGS. 7, 9, 10 and 11 for two different voltages;

DETAILED DESCRIPTION

Figure 1:
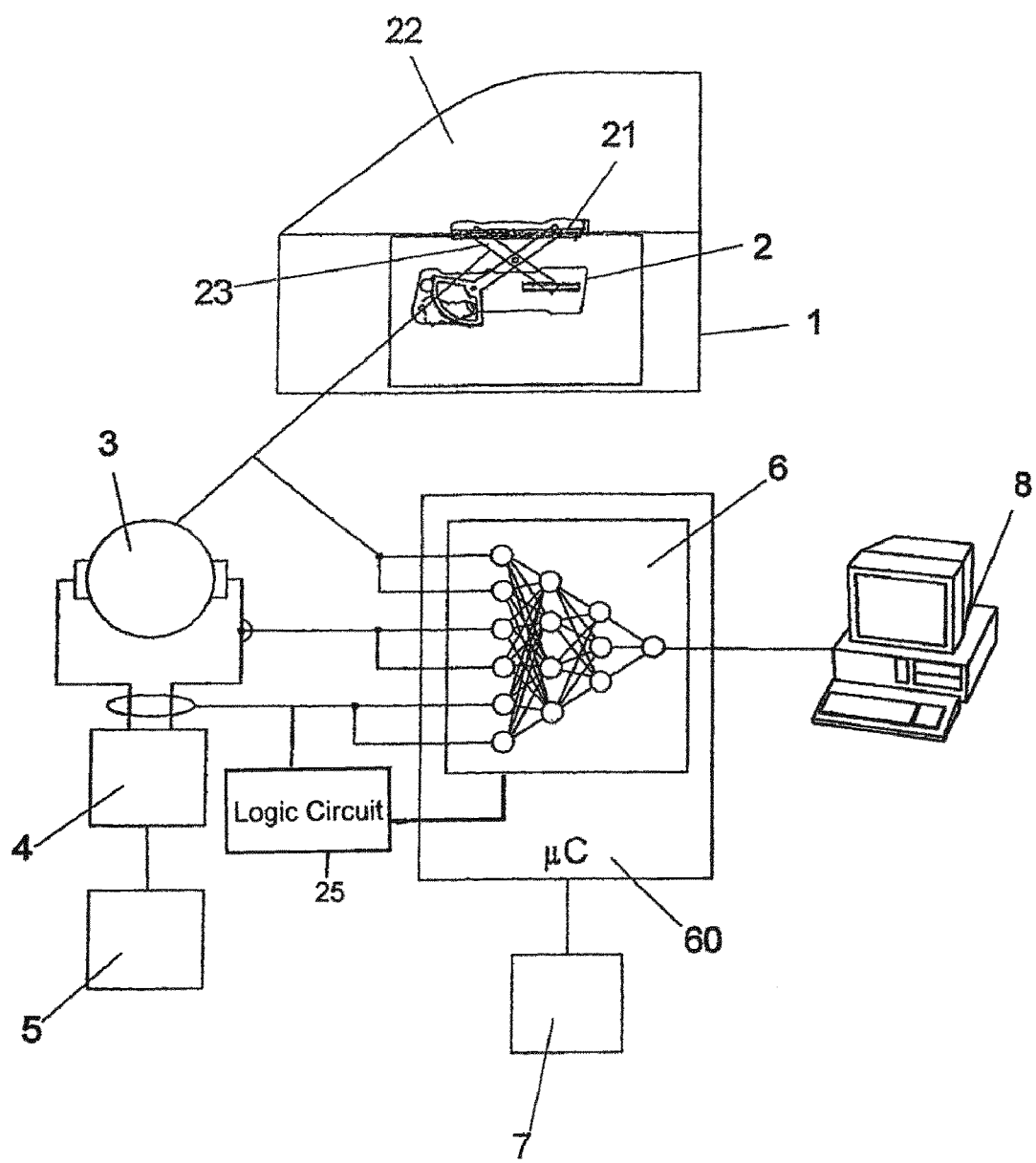
FIG. 1 is a schematic illustration of a system for determining the force with which a drive device drives a window lifter in a motor vehicle door for adjusting a window pane.

FIG. 1 is a schematic illustration of an open-loop and closed-loop control system for a motor-driven window lifter 2 in a motor vehicle door 1. The window lifter 2 has a lifting rail 21 to which a window pane 22 is attached as an adjustable component. The lifting rail 21 can be moved by means of a lifting device 23 and a drive motor 3 which forms a drive device together with the window lifter 2, with the result that the window pane 22 can be raised and lowered. The drive motor 3 is fed from a voltage source 5 via a switching device 4 which determines both the rotational speed and the direction of rotation of the drive motor 3.

A microprocessor 60 which serves as an open-loop and closed-loop electronic control system supplies the switching device 4 with open-loop and closed-loop control signals and is connected to an operator control device 7, for example to the push button keys or switches for operating the window lifter 2. A temporary connection can be made to a microcomputer 8 in order to implement one or more leaning phases of the microprocessor 60.

Since there is a risk of body parts or objects becoming trapped between the edge of the window pane 22 and the door frame of the motor vehicle door 1 when the door opening which can be covered by the window pane 22 is closed as a result of the window pane 22 lifting, in window lifters which are driven by a drive motor a trapping prevention device is prescribed, said device detecting the trapping of an object and causing the drive motor 3 to be stopped or reversed, thus stopping or reversing the direction of movement of the window lifter 2.

The trapping prevention means must ensure that the trapping force which acts on a body part or on an object located in the adjustment travel of the window pane 22 does not exceed a legally prescribed limiting value. In this context, in the upper sealing region it is necessary to ensure that, on the one hand, the window pane 22 reliably closes, for which purpose an increased adjusting force has to be applied in order to overcome the resistance offered by the window seal, and on the other hand this adjusting force must be dimensioned, for safety reasons, in such a way that a 4 mm rod is detected and the trapping prevention means switches off or reverses the window lifter 2. This means that even acceleration forces which are due to external influences such as a poor section of road are reliably detected with the resulting acceleration of the vehicle perpendicular to the direction of travel, in order to rule out malfunctions of the trapping prevention means.

For this purpose, a force which is referred to as a reversing force is impressed on the force which is actually only necessary for the translatory adjustment of the window pane 22, the magnitude of said reversing force being limited. The sum of the two forces is equal to the adjusting force which is output by the drive device and which is used to adjust the window pane 22. The reversing force therefore constitutes a force reserve for overcoming additional opposing forces. It can have a different boundary in the various parts of the range of the overall adjustment travel of the window pane 22, a higher value being selected for this boundary, for example, owing to the high resistance of the window seal in the upper region of the adjustment travel where the window pane 22 runs into the door seal than in the adjustment region which is below it so that it is reliably ensured that the window pane moves into the seal region.

Figure 2:
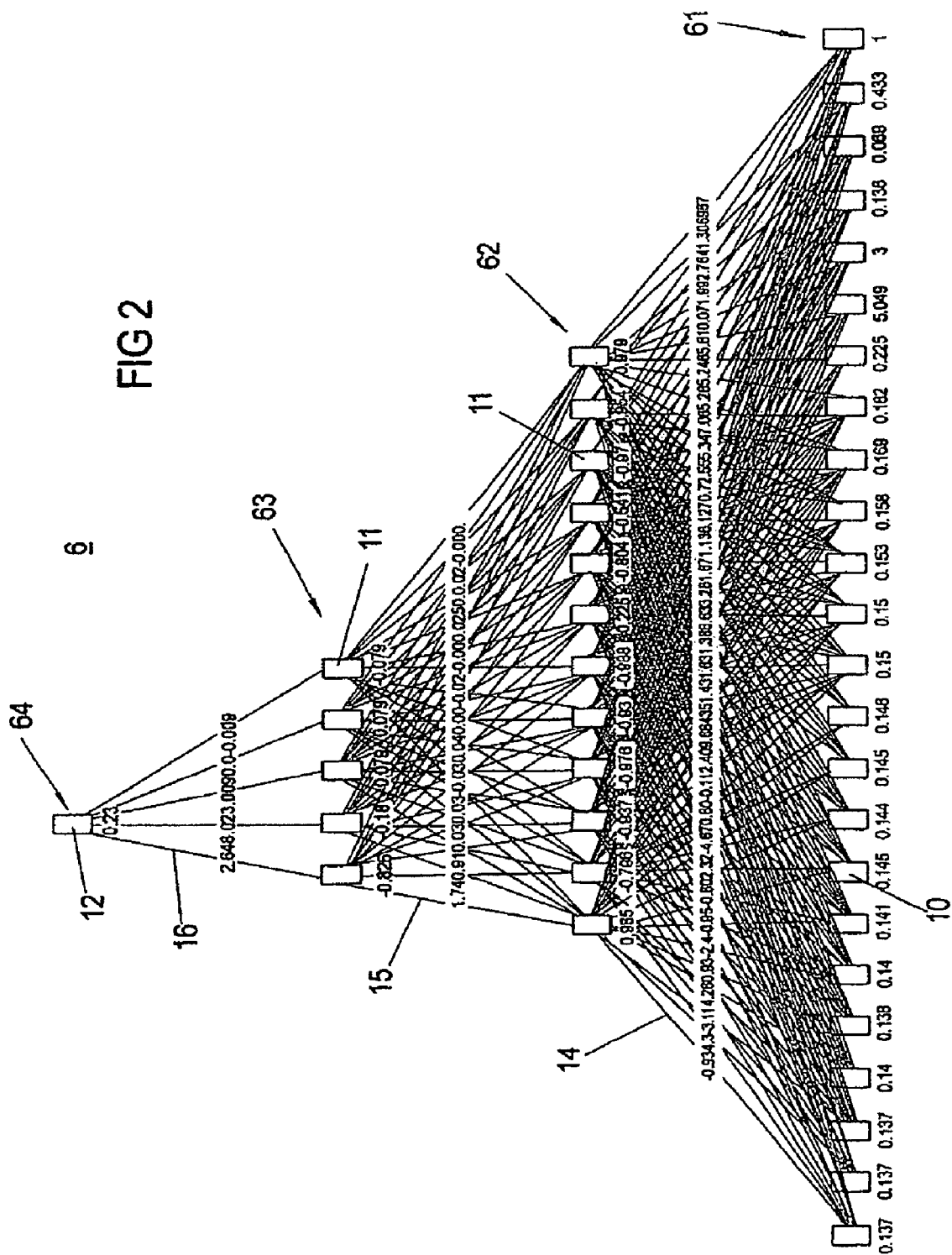
FIG. 2 is a schematic illustration of a neural network which can be used in the system according to FIG. 1.

According to the invention, open-loop and closed-loop control of the switching device 4 for operating the drive motor 3 of the drive device is carried out by means of a neural network 6 which is embodied by means of the microprocessor 60 and whose structure is illustrated schematically in FIG. 2.

The components of the neural network 6 which is illustrated in FIG. 2 are neurons 10, 11, 12 which are composed of an input vector, a weighting vector and a transfer function with an activation function and output function. The neural network 6 is thus composed of a set of neurons 10, 11, 12, arranged in layers 61, 62, 63, 64, and weighted connections 14, 15, 16, and has the structure of a directional graph to which the following restrictions and supplements apply:

the nodes of the neural network are formed by the neurons 10, 11, 12, the edges of the neural network are called connections there are weighted connections between the neurons of adjacent layers 61, 62, 63, 64 the input layer 61 is used to pick up the input signals one or more hidden layers 62, 63 serve to process the signals which are output by the input neurons 10 of the input layer 61 and permits complex functions to be modeled, the output layer 64 outputs the result which is determined from the processed input signals.

So that the neural network 6 is capable of learning, the individual inputs of a neuron 10, 11, 12 must be able to be given different weightings. The weighting causes the connections between the individual layers 61, 62, 63, 64 to have different strengths so that the connections between the input layer 91 and the output layer 94 do not always transmit to an optimum degree the information which is input by the input signals but rather they do not transmit it at all if the weighting of the connection is 0, that is to say there is no connection, they inhibit the connection if the weighting is negative, and they initiate the connection if the weighting is greater than zero.

In order to sense a trapped state, the braking of the drive device is determined by a rise in the period length and/or the power drain of a drive motor of the drive device. If the power drain of the drive motor is determined during this indirect detection, for example the last 12 current values of the motor power drain, an adaptation current, which reflects the motor torque for a motor voltage of, for example, 13 V, and the last three voltage values are sensed as input values. During a period evaluation, for example the last period values, e.g. 12 period values, an adaptation period which is measured at a standard voltage of, for example, 13 V, and the last three voltage values are sensed. In a learning phase, in this context learning is carried out with a clip-on force measuring instrument with values of 2 N/mm and 20 N/mm, said instrument outputting the measured output value of, for example, 0-160 N in an analogous way to the input signals so that the neural network in the application also outputs part of the shifting force and outputs the built-up force when trapping occurs.

The neural network 6 illustrated in FIG. 2 has, in the input layer 61, a number of 24 input neurons 10 at which there are various input signals with different weightings such as a period length and/or the power drain of the drive motor 3 according to FIG. 1, voltage values, a run up flag which indicates the running up of the drive motor 3 as well as adaptation periods which designate the period which is associated with the respective position of a reference travel operation which is carried out in a learning phase and stored, for a predefined reference voltage. The adaptation period is, as explained in more detail below with reference to FIGS. 13 to 15, calculated and averaged in a smaller neural adaptation network than the one used in the application, i.e. at each full rotation (4 quarter periods) of the drive motor the neural network calculates a new adaptation period which is made available as an adaptation period in the next window lifter travel operation. The value range is mainly determined by minimum and maximum values which occur, and at the same time an attempt is made to position the input pattern of the inputs as far as possible between 0 and 1.

Each input neuron 10 of the input layer 61 is connected to the hidden neurons 11 of a first hidden layer 6 by a multiplicity of connections 14 to which different positive or negative weightings are assigned. The hidden neurons 11 of the first hidden layer 62 have different positive and negative weightings and are connected via a plurality of connections 15, which are also weighted positively or negatively, to the hidden neurons 11 of a second hidden layer 63 whose inputs are also given differing positive or negative weightings. Finally, the hidden neurons 11 of the second hidden layer 63 are connected via likewise positively or negatively weighted connections 16 to an output neuron 12 of the output layer 64, at which neuron the output value which is determined from the input values is present.

The weighting of the inputs and connections of the neurons of the multi-step neural network 6 which is illustrated in FIG. 2 is carried out after a first empirical predefinition in a learning phase in which new connections are developed, existing connections deleted, the strengths of the connections modified by changing the weightings, threshold values and transfer functions are modified, new neurons developed and existing neurons deleted. In the neural network 6 which is used according to the invention use is made of these possibilities of learning in the learning phase, in particular of the modification of the strength of the connections by changing the weightings, the modification of the threshold value and the modification of the transfer function.

In the unlearned state in the learning phase, at first values are randomly predefined. According to the principle of monitored learning, various input patterns are subsequently prescribed and the associated output value is calculated. The difference between the calculated output value and a prescribed setpoint output value is then determined and the neural network 6 is then modified from this by means of the learning rule.

The greater the difference between the calculated output value and the predefined setpoint output value, the more the weightings are changed so that the fault or the deviation of the calculated output value from the predefined setpoint output value from the output layer 64 is calculated back to the hidden layers 63, 62 and then to the input layer 61.

After the termination of the learning phase, the neural network 6 is capable of calculating the correct output value from unlearnt, similar input patterns. Weaknesses in the function of the neural network 6 can be eliminated here by renewed learning of specific, predefined situations. Compared to known methods for determining the adjusting force, trapping force or reversing force, this provides the advantages that there is no individual assessment of the input signals as when the previous algorithm is applied but rather the sum of all the inputs is interpreted. Furthermore, nonlinear relationships such as the behavior of the drive motor 3 according to FIG. 1 can be modeled and signal profiles which cannot be evaluated with the previous algorithm or can only be evaluated with a restriction are correctly interpreted or calculated so that an instantaneous force output value which is necessary for a reliable trapping prevention means is determined. This function will be explained in more detail with reference to various signal profiles illustrated in FIGS. 3 to 6.

Figure 3:
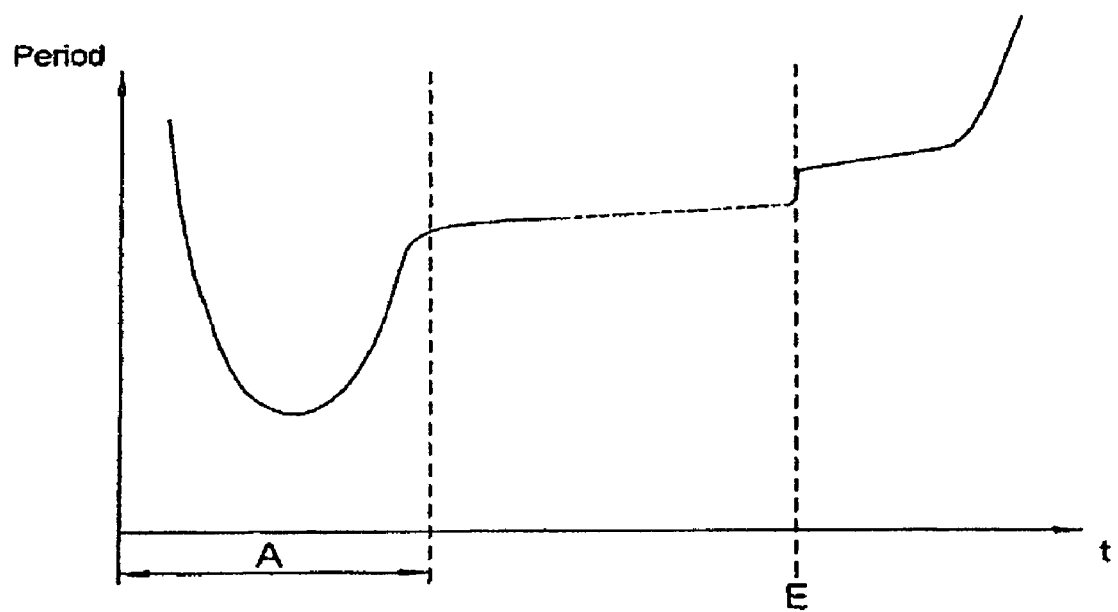
FIGS. 3 to 6 show illustrations of various parameters plotted against time, during the adjustment of the window lifter system according to FIG. 1.

FIG. 3 shows a simplified illustration of the profile of the period length of the drive motor of the drive device plotted over time t during the lifting of a window pane from its lowest position into its uppermost position in which the window pane completely covers the door opening of a motor vehicle door.

In the run up phase A, the period length firstly decreases strongly and rises strongly after a minimum value. The decrease in the period length is equivalent to an acceleration of the drive motor in the run up phase A which is associated with a corresponding building up of force. After the run up phase A ends, the period length remains virtually constant or rises slightly since the friction can increase with the distance covered owing to the guiding of the window in the window seal. Since the friction increases greatly during the running in process E of the window pane into the upper window pane seal, the period length rises suddenly and then runs virtually linearly or in a slightly rising fashion until it increases steeply when the upper stop is reached.

This characteristic profile of the period length when a window pane closes gives rise to large forces in the run up phase A with the known trapping prevention method and trapping prevention devices. Changes on the distance covered by the window pane can only be compensated by parameter changes so that, for example during the running in to the seal, the window pane does not remain stationary owing to increased friction or reverses owing to the response of the trapping prevention means.

Figure 4A:
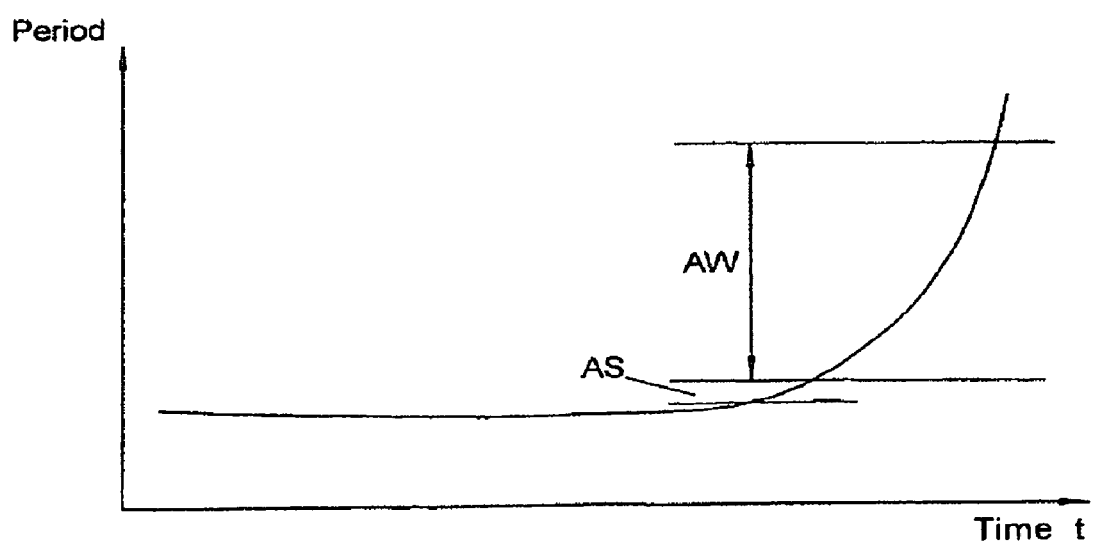
Figure 4B:
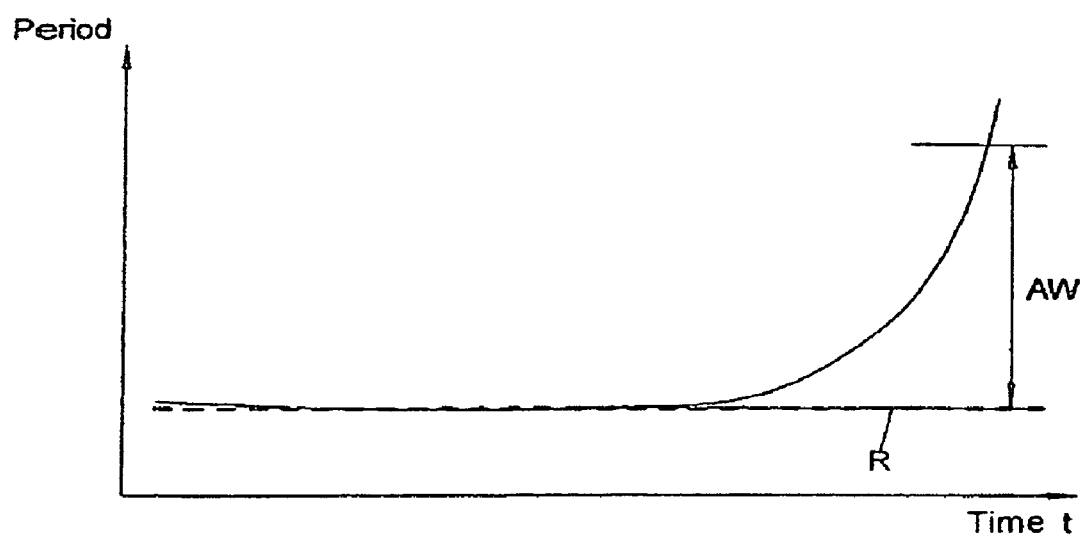

FIGS. 4A and 4B show two different methods for sensing a trapping process by means of a profile of the period length plotted against the time axis t.

FIG. 4A shows a purely relative registration of the period length plotted against time t, a case of trapping being detected by a rise in the period length which is associated with a corresponding build up of force. In the case of purely relative registration, only the change in the period length over time is monitored during the adjustment of the window pane, and the window pane is stopped or reversed when the triggering threshold AS is exceeded, but no absolute values are registered or monitored.

FIG. 4B shows the period length plotted against time t for a purely absolute registration system in which a rise in the period is also associated with a corresponding build up of force. The trapping prevention means is triggered when a predefined absolute value AW of the period length, as against a preprogrammed reference curve R, is exceeded.

Figure 5:
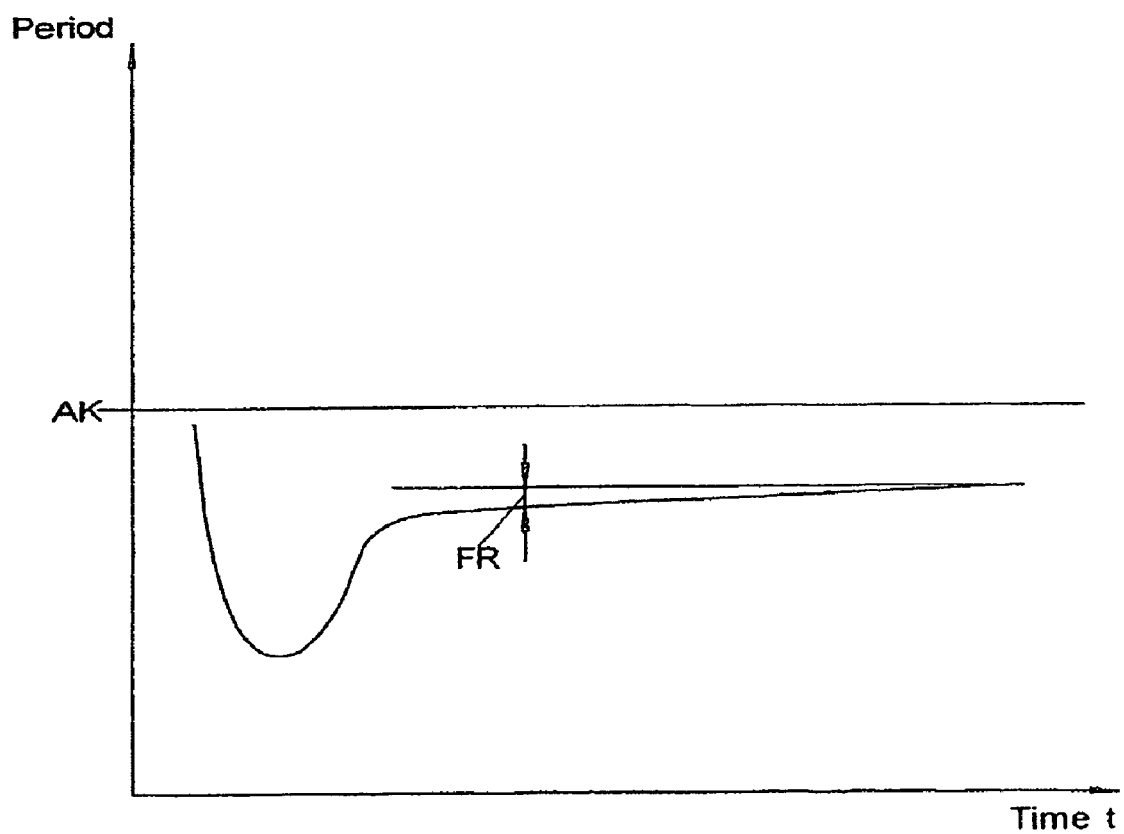

FIG. 5 shows a schematic profile of the period length plotted against time t in the case of a low spring constant, i.e. a spring constant FR of, for example 2N/mm of the adjustment system. The profile plotted against time shows the slow build up of force owing to the slight rise in the period length over the adjustment travel after the run up phase ends, while, for example, when one relative detection system is applied large forces can be built up owing to the slight rise, and when the absolute detection system is applied large forces can be built up owing to the long time period until a switch-off criterion is reached.

Figure 6:
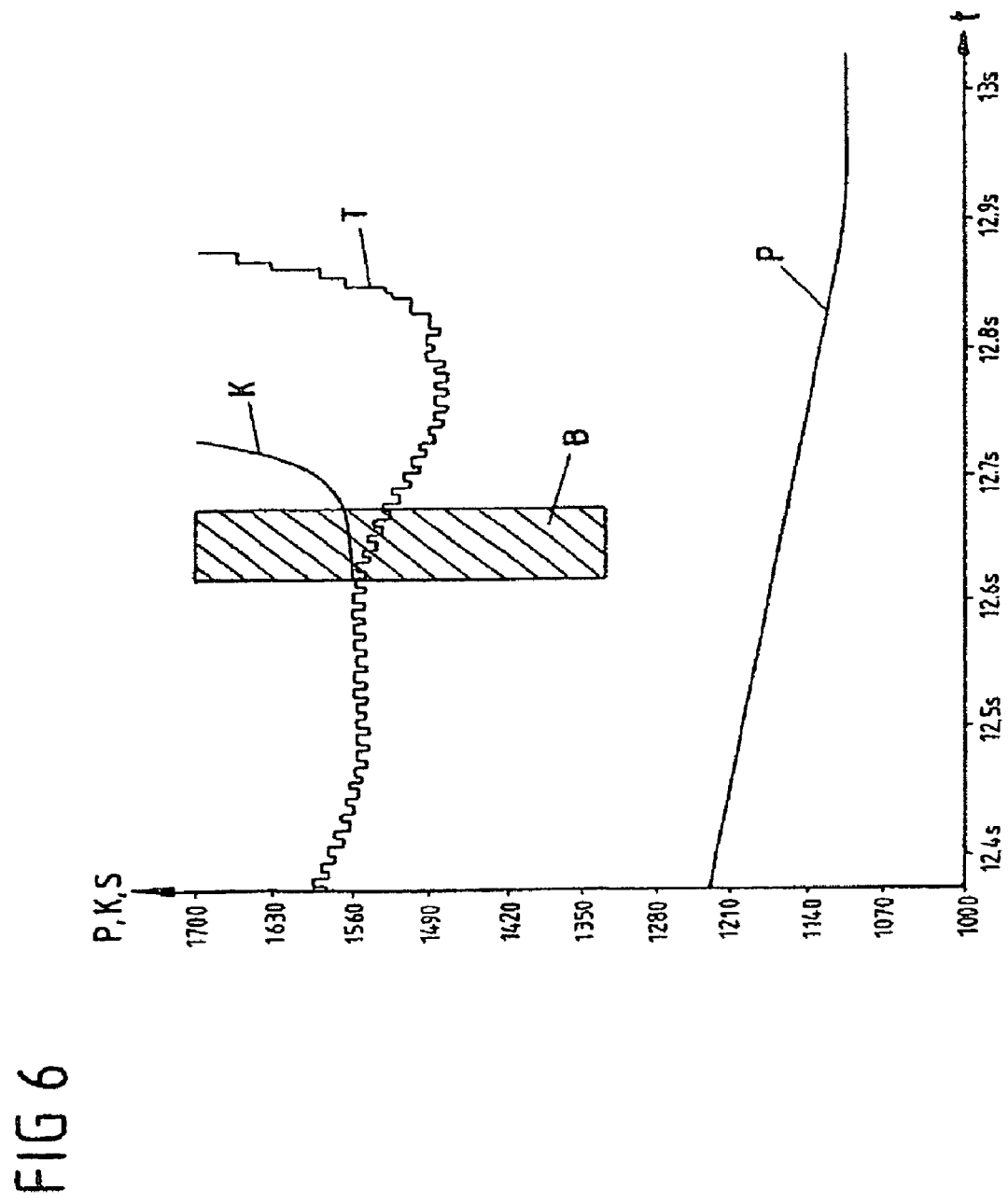

FIG. 6 is a schematic view of the profile of the period length T, of the position P and of the (adjustment) force plotted against the time axis t when an external acceleration occurs, for example when a section of poor road is traveled over, or as a result of ease of movement which is restricted on a local basis and/or limited in terms of time in the adjustment travel. Owing to the supported effect of the acceleration forces or the reduction in or the elimination of frictional forces during the movement of the pane, the period length T drops briefly, that is to say the window pane is briefly accelerated. If the adjusting force in the acceleration range B has a force superimposed on it, a steep build up K of force occurs, which is not detected with the known trapping prevention methods since only positive changes in period are detected. In the acceleration range B which is illustrated by dashed lines in FIG. 6, the known trapping prevention controllers are thus not capable of functioning.

With reference to the illustrations of the period length plotted over time in FIGS. 3 to 6, the following problems and disadvantages occur when the known trapping prevention methods are applied:
 a) large forces occur at low spring constants and the detection of a 4 mm rod is poor in all directions,
 b) overcompensation occurs when there are voltage jumps and sections of poor road resulting in large offsets with very large forces so that, for example, a voltage dip occurs in the onboard power system, which dip is associated with a rise in the period length and is compensated by an offset, resulting in harmonics and associated large trapping forces,
 c) force can be detected only by a rise in the period length, and when there is a degression in the period length (FIG. 6) large forces can occur,
 d) changes occur in the profile of the adjustment travel of the adjustable component, said changes being associated with gradual changes such as ageing, abrasion of the seal and running in of the window lifter as well as irregularities of the motor which always point to the same position and have to be compensated by parameter changes,
 e) large forces occur in the run up phase.

In the known trapping prevention methods, the period and voltage input signals are considered separately. Starting from a response threshold, a voltage filter acts here only in one direction and a force detection process is possible only by sensing a rise in the motor period. On the other hand, in contrast to the known trapping prevention methods, the period and voltage input signals are logically combined with one another in the inventive application of a neural network so that a voltage filter is not required and changes in period are detected in each direction. Furthermore, in contrast to the known method, the period length of the drive motor is adapted and not an offset.

With respect to the problem cases illustrated above in FIGS. 3 to 6, when correct detection occurs and a trapping prevention means is triggered the use of a neural network provides the following results after the learning phase has ended.

1. Low spring constants are detected in a settable fashion, i.e. by selecting the learning data and prescribing the setpoint output value or force value it is possible to define how sensitive the system is to be at low spring constants. This is learnt by defining the operating point between the relative and absolute operating methods illustrated in FIGS. 4A and 4B, the operating point being settable in an infinitely variable fashion. This mixed operating method permits low spring constants and thus a slow rise in the period length to be detected by virtue of the fact that large deviations from the absolute component arise.

2. In the known trapping prevention methods, a voltage dip is compensated, which causes the slowing down of the system to be compensated by an offset to the switch-off value. On the other hand, the neural network receives the information of the voltage dip as a slowing down of the period length, in which case all the information is treated as of equal priority. As a result, voltage dips can be learnt, i.e. the system learns the complex, nonlinear dynamic behavior of the drive motor. A rise in voltage, for example in the form of a voltage ramp, thus does not lead to large forces so that large fluctuations in force, for example when a sinusoidal voltage is applied, do not arise. The absolute component which is sensed in the mixed operating method makes it possible to detect whether the period length is still in a valid range when the vehicle travels over a section of poor road.

3. As a result of the absolute component which is sensed in the mixed operating method, it is also ensured that even when acceleration occurs the superimposition of a build up of a force (FIG. 6) is detected in good time and reliably, which is not possible with the known trapping prevention methods, since there must always be a nominal rise in the period length in order to detect a build up of force.

4. Changes to the adjustment travel of the adjustable component are learnt adaptably so that gradual changes such as ageing, abrasion of the seal and running in of the window lifter as well as irregularities of the motor which always occur at the same position are compensated by adaptation and increases in force or incorrect switching off or incorrect reversing do not occur.

5. When a relative detection system is used with the known trapping prevention methods, the running up behavior of the drive device can be differentiated from a case of trapping only with difficulty. When a neural network is used, this process is learnt and is, if appropriate, marked by a run up flag.

6. In the known trapping prevention method, different parameters are used to sense a case of trapping, sufficiently accurate sensing of force occurring only as a result of appropriate interplay between these various parameters. In contrast, when a neural network is used only an individual value, which permits a decision about the switching off or reversal of the drive device, specifically the output value of the output layer, is decisive so that a continuous adjustment of the switch off force which triggers the trapping prevention is possible.

A back propagation network is illustrated in a schematically simplified form in FIGS. 7 to 11, which network can be used to determine the force with which a drive device adjusts a window pane as an adjustable component by means of a window lifter or traps an object located in the adjustment travel of the window pane and thus outputs a switch-off or reversing value.

Figure 7:
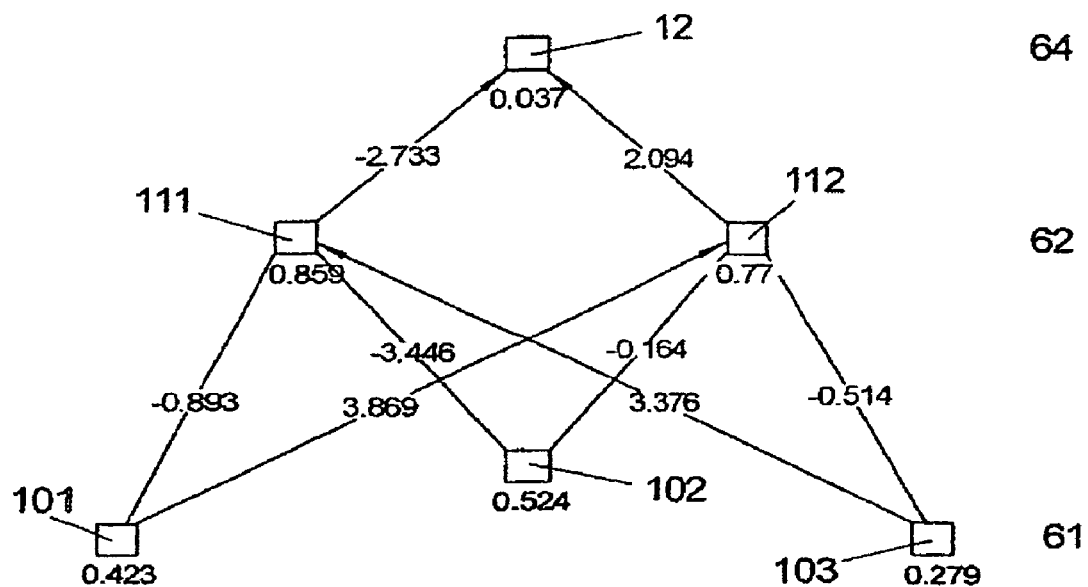
FIG. 7 is a schematic illustration of an input pattern of a back propagation network.

FIG. 7 shows a first input pattern of the back propagation network with three layers, specifically an input layer 61, a hidden layer 62 and an output layer 64. The neurons 101, 102, 103, 111, 112 which are arranged in the input layer 61 and the hidden layer 62 are connected by edges to the layer 62 or 64 respectively lying above it, with each edge symbolizing a weighting value which is attributed to the respective neuron.

The input values for the period length, motor voltage and adaptation period which are positioned in a value range which is suitable for the input neurons 101, 102, 103 are applied to the input layer 61. The first input neuron 101 to which the period length is applied has a weighting of 0.423, the second input neuron 102 to which the motor voltage is applied has a weighting of 0.524 and the third input neuron 103 to which the adaptation period is applied has a weighting of 0.279.

The hidden layer 62 contains two hidden neurons 111, 112 which are connected to the outputs of the input neurons 101, 102, 103 at the input end. The first hidden neuron 111 is connected to the outputs of the input neurons 101, 102, 103 by means of connections with the connection weightings −0.893, −3.446 and 3.376. The second hidden neuron 112 is connected to the outputs of the input neurons 101, 102, 103 via connections with the connection weightings 3.869, 3.376 and −0.514.

The output layer 64 is illustrated by means of an output neuron 12. The level of this output value is decisive later for a switch-off value by means of the reversing or the continuation of the running of the window lifter, which value can be set for the respective voltage.

In addition, the neurons 111, 112 and 12 of the hidden layer 62 at a higher level and of the output layer 64 have a threshold value or bias value which shifts the output of the transfer functions into the constant region. The bias value and the weightings are constants which are no longer changed or relearnt in the application or in a series use. They are determined once before the series use and stored, for example, in an EEPROM. If weak points become apparent in the algorithm, it can be improved by setting new parameters, i.e. by relearning. However, the weightings remain in the application.

In the learning phase, input patterns are presented to the neural network and the associated defined output values are predefined. The more the predefined output value differs from the output value calculated by the neural network with the respective weightings and bias values, the more the weightings and the bias value change. In this context, for example the following specific patterns are selected:

voltage jumps during the running of a window lifter with a rising period, a dipping voltage and determination of the adaptation period with an associated output value of 0 since the neural network will not be able to detect any force in this case, clipped running with a clip-on force measuring instrument with fed back force from the clip-on force measuring instrument as an output value for the neural network with a rising period length, dipping voltage and determination of the adaptation period, learning of various spring constants of, for example, 20 N/mm and 2 N/mm etc.

Figure 8:
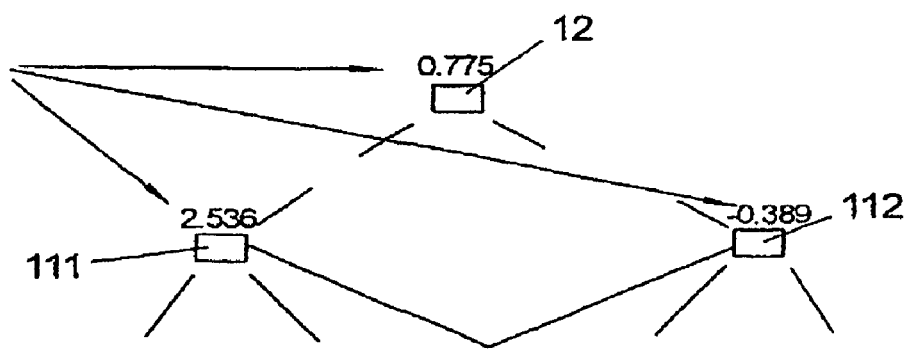
FIG. 8 is a schematic illustration of the bias voltage of neurons of the network according to FIG. 7.

The output value which is associated with the respective input pattern is determined with the bias values 2.536 which are illustrated in FIG. 8 and entered by means of the neurons 111, 112 and 12 for the first hidden neuron 111 and −0.389, for the second hidden neuron 112 as well as 0.775 for the output neuron 12, the weightings, the transfer functions and the input values. The output value is determined as follows, the respectively calculated output value being given below the output neuron 12 or the hidden neurons 111, 112 in FIGS. 7, 9, 10, and 11.

At first, the output of the first hidden neuron 111 is calculated as follows:

$$\Sigma = \text{Bias}(i) + w_{ij} * \text{input}(j)$$

i being the i-th neuron in the next highest layer and w being the weighting and j being the counting variable for the input layer 61. The weightings are multiplied by the input values and then summed, from which the first hidden neuron 111 is obtained as follows:

$$\Sigma_{111} = 0.423 \cdot (-0.893) + 0.524 \cdot (-3.446) + 0.279 \cdot 3.376 + 2.536 = 1.294$$

This sum is then inserted into the transfer function. The transfer function which is used here is a hyperbolic tangent. This provides the output value of the first hidden neuron 111 as $$\text{output}_{111} = 0.859$$

and the output value of the second hidden neuron 112 is obtained as $$\Sigma_{112} = 0.423 \cdot 3.869 + 0.524 \cdot (-0.164) + 0.279 \cdot (-0.514) - 0.389 = 1.018$$

$$\text{output}_{112} = \text{TAN } H(1.018) = 0.77$$

and the output value of the output neuron 12 is obtained as $$\Sigma_{12} = 0.77 \cdot 2.094 + 0.859 \cdot (-2.733) + 0.775 = 0.037$$

or output = TAN $H(0.037) = 0.037$

In the first input pattern which is illustrated in FIG. 7, the values for the period length are 0.423 and the voltage is 0.524, which corresponds to a voltage of 10 V. The adaptation period has a lower value, specifically 0.279.

Figure 9:
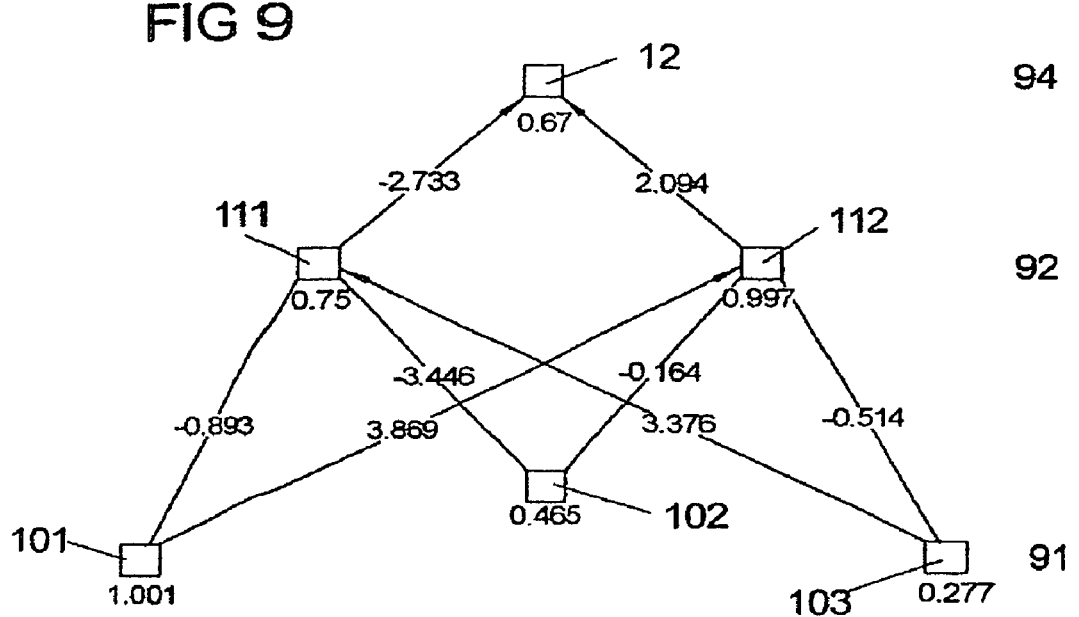
FIGS. 9 to 11 show further input patterns of the back propagation network according to FIG. 7.
Figure 10:
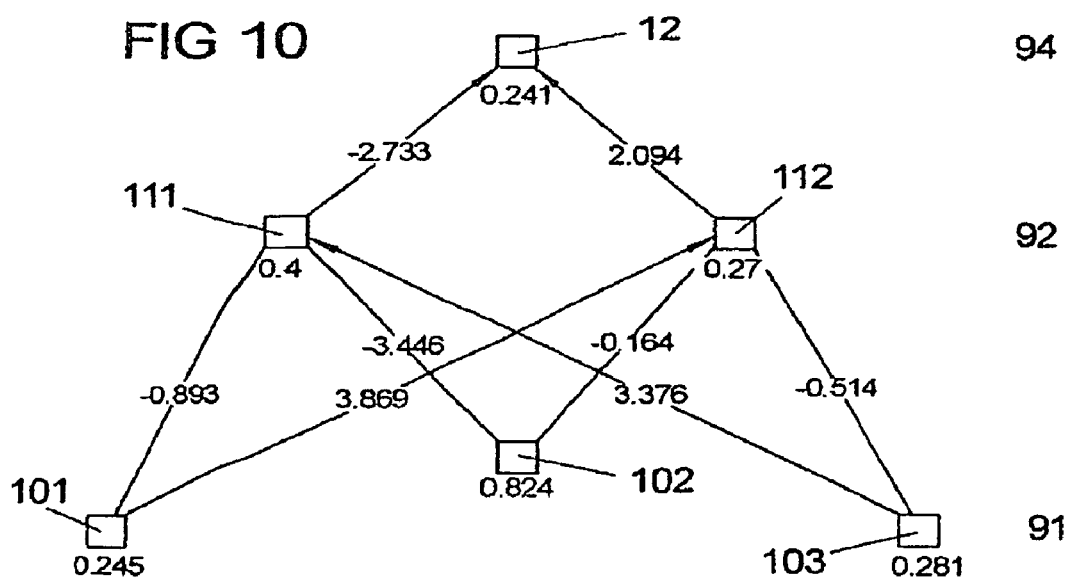
Figure 11:
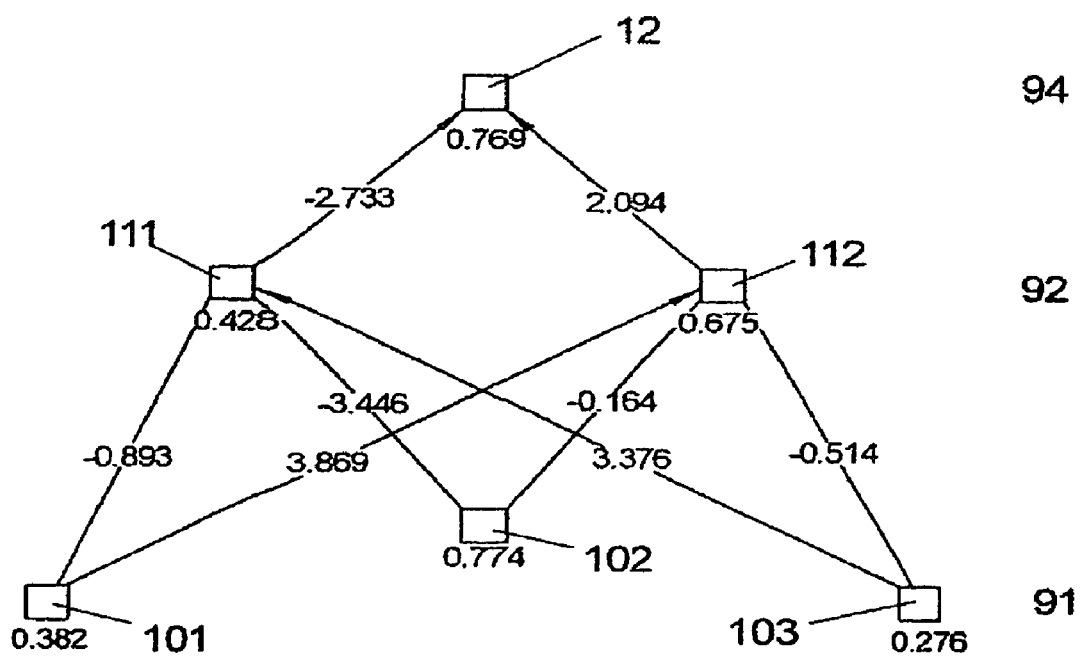

Three further input patterns which are illustrated schematically in FIGS. 9, 10, and 11 are considered below.

The second input pattern which is illustrated in FIG. 9 differs from the first input pattern illustrated in FIG. 7 to a great extent by virtue of the period length of 1.001 as against 0.423, while the voltage and the adaptation period remain approximately constant at 0.456 or 0.277, respectively. Likewise, the connection weightings with which the hidden neurons 111, 112 are connected to the outputs of the input neurons 101, 102, 103 as well as the bias values of the hidden neurons 111, 112 and of the output neuron 12 remain unchanged.

This results, as described above with reference to FIG. 7, in the output values 0.75 for the first hidden neuron 111 and 0.997 for the second hidden neuron 112 as well as 0.67 for the output neuron 12.

In the third input pattern illustrated in FIG. 10, the voltage value is assumed to be 16 V with an input value of 0.824. The period length is 0.245 and the adaptation period is slightly modified at 0.261. As a result of this, the output value of the output neuron 12 at which no trapping is detected from the input pattern is 0.241. Nevertheless, such input patterns can be differentiated from trapping patterns, which is clarified by means of the schematic illustration of the back propagation network in FIG. 11.

In the input pattern according to FIG. 11, the motor voltage has dipped slightly with the value 0.774, while the period length has risen, compared to the comparison value, from 0.245 to 0.382.

In FIGS. 12A and 12B two diagrams are illustrated which graphically illustrate the learning success of the neural network which is illustrated in FIGS. 7 and 9 as well as 10 and 11 for voltage values of 10 V and 16 V as well as the input patterns predefined in FIGS. 7 and 9 as well as 10 and 11. The predefined learning values which result from the back propagation networks according to FIGS. 9 and 11 are illustrated in the form of the predefined trapping force in respectively bold continuous lines while the output values which result from the respective input patterns according to the back propagation networks in FIGS. 7 and 10 are presented by the thin continuous curve representations.

Figure 13:
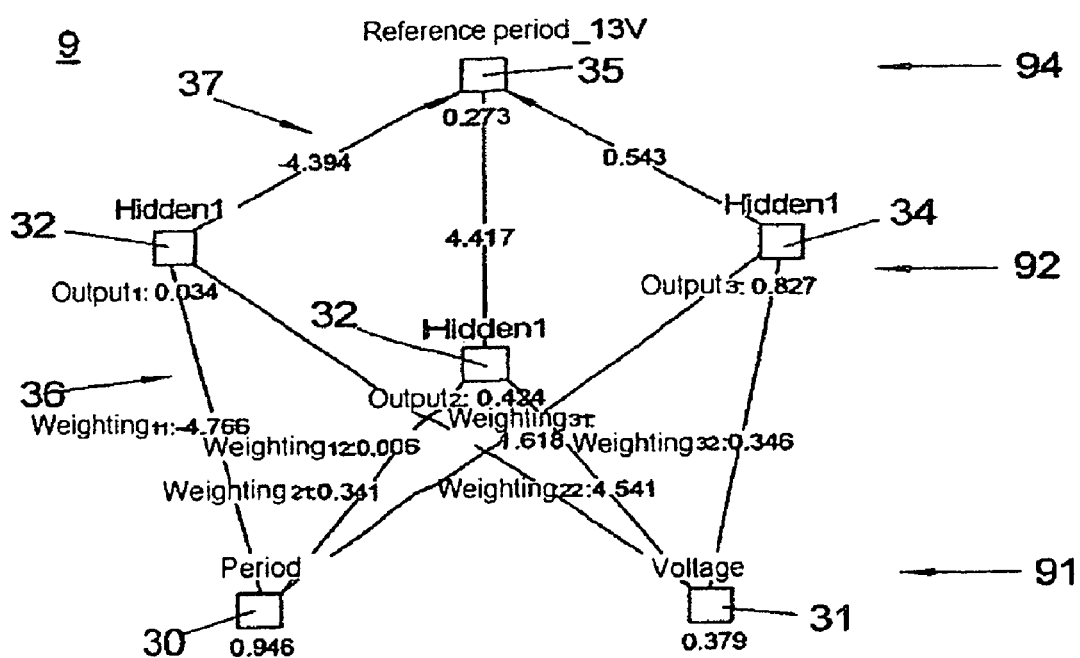
FIG. 13 is a schematic illustration of a neural adaptation network for determining a reference period with a drive motor voltage of 9 V.

FIG. 13 shows the structure of a neural adaptation network 9 for determining position-dependent adaptation values for different terminal voltages of the drive motor 3 according to FIG. 1 and is conceived as an independent neural network whose output layer 94 outputs voltage reference values to the input layer 61 of the neural network according to FIG. 2. It has the function of determining a reference-voltage reference curve which is typical for the instantaneous drive motor behavior even if the voltage which is applied to the drive motor at a particular time deviates from the reference voltage.

An input neuron 10 of the neural network 6 according to FIG. 2 for determining an output value which corresponds to the adjusting force or excess force of the drive device or of an output value corresponding to a trapped or an untrapped state receives, as a function of the position, the adaptation values which are output by the neural adaptation network 9 according to FIG. 13 in the output layer 94 so that this input of the neural network 6 according to FIG. 2 serves as information for the currently present shifting force, difficulty of movement or ease of movement of the drive system. In addition, this information is also used for the running in of the window pane 22 according to FIG. 2 into the window pane seal in order to make the entire system less sensitive.

If the equation $$\frac{n_1}{n_2} = \frac{U_1}{U_2}$$

were to be used for adaptation to the respective voltage value, in which equation $n_1$, corresponds to the rotational speed at the voltage $U_1$ and $n_2$ corresponds to the rotational speed at the voltage $U_2$, the result which is interpolated onto the reference voltage would be too imprecise for an absolute system and would be very greatly dependent on the type of motor. Accordingly, the neural adaptation network is trained to a specific drive motor and calculates, from the periods and the current voltage, a reference period which is defined for the torque at the reference voltage. This reference period is position-dependent and is used by the superordinate neural network 6 according to FIG. 2 as an input value for the respective next adjustment movement, i.e. for the next window travel operation.

While the fault during the direct conversion by means of the above formula is 10-15% bandwidth, when calculation is carried out by means of the adaptation network a maximum fault of 4% occurs, and when the characteristic curve is not bent it is even a maximum of 2% bandwidth. This increased precision benefits the precision when determining the adjusting force by means of the neural network 6 according to FIG. 2 because a fault of 12% bandwidth results in a force difference of 40 N when there is a spring constant of 2 N/mm in the system as a whole, and a force difference of 18 N when there is a spring constant of 10 N/mm. As a result of this, a force fluctuation with low spring constants is at maximum 7 N and a force fluctuation with relatively high spring constants of 10 N/mm is at maximum 3 N if a neural adaptation network is used.

The neural adaptation network 9 illustrated as an example in FIG. 13 forms an independent neural network. It exists, like the neural network 6, for determining an output value which corresponds to the adjusting force or excess force of the drive device or of a trapped or nontrapped state from a set of neurons 30, 31, 32, 33, 34, 35 which are arranged in layers 91, 92, 94, and weighted connections 36, 37, and has the structure of a direction graph for which the restrictions and supplements mentioned above with respect to the neural network 6 according to FIG. 2 apply.

The neural adaptation network 9 which is determined empirically until the best learning results are obtained has two input neurons 30, 31 in the lowest layer or input layer 91, said neurons 30, 31 designating the period length and drive motor voltage input signals with different weightings. The input neuron 30 which corresponds to the period length can constitute a mean value composed of optionally 4, 8, 12 periods in order, for example, to compensate for the asymmetry of the annular magnet of the drive motor, while the input neuron 31 which corresponds to the drive motor voltage represents the respectively currently filtered voltage value.

Since both the period length for each quarter rotation of the drive motor and the voltage are always present, the required values are available at any time to the adaptation means which operates at a high clock frequency and said values do not need to be synchronized with a full rotation of the drive motor. The output value of the neural adaptation network 6 is used if the position of the component to be adjusted has not changed by one rotation of the drive motor.

Each input neuron 30, 31 of the input layer 91 is connected to three hidden neurons 32, 33, 34 of a hidden layer 92 by means of a plurality of connections 36 to which different weightings are assigned. The three hidden neurons 32, 33, 34 of the hidden layer 92 have different positive and negative weightings and are connected to an output neuron 35 of the output layer 94 by means of a plurality of positively or negatively weighted connections, an adaptation period which is determined from the input values and is standardized to the reference frequency being present at said output layer 94.

The weighting of the inputs and connections of the neurons of the multi-stage neural adaptation network 9 which is illustrated in FIG. 13 is carried out after a first value is predefined empirically in a learning phase in which new connections are developed, existing connections are deleted, the strengths of the connections are modified by changing the weightings, threshold values and transfer functions are modified, new neurons are developed and existing neurons are deleted.

The weightings and the bias constitute the intelligence of the neural adaptation network and model the behavior of the drive motor between two extreme voltages of, for example, 9 and 16 V.

In order to train the behavior of the drive motor in an optimum way at all possible torques in order to determine the network weightings, the drive motor is clamped into an engine brake which supplies the signal for the torque. The drive motor is operated with an electronic system and the voltage and period are read out. This information is documented in synchronism with the torque and the absorption behavior at each voltage is carried out at the idling speed up to the blocking of the drive system. A longer interval is interposed between each measurement so that the drive motor cools again.

If increased precision is required under different climatic conditions, the same drive motor is operated at different temperatures, the motor temperature itself being kept constant. Instead, it serves as a possible further input for the neural adaptation network. The motor temperature can also be determined with a neural temperature network by means of the idling speed and the voltage. The motor temperature which is determined in this way can additionally also be used for temperature protection of the drive motor since it is more precise than a temperature sensor which is mounted on the exterior of the vehicle.

Figure 14:
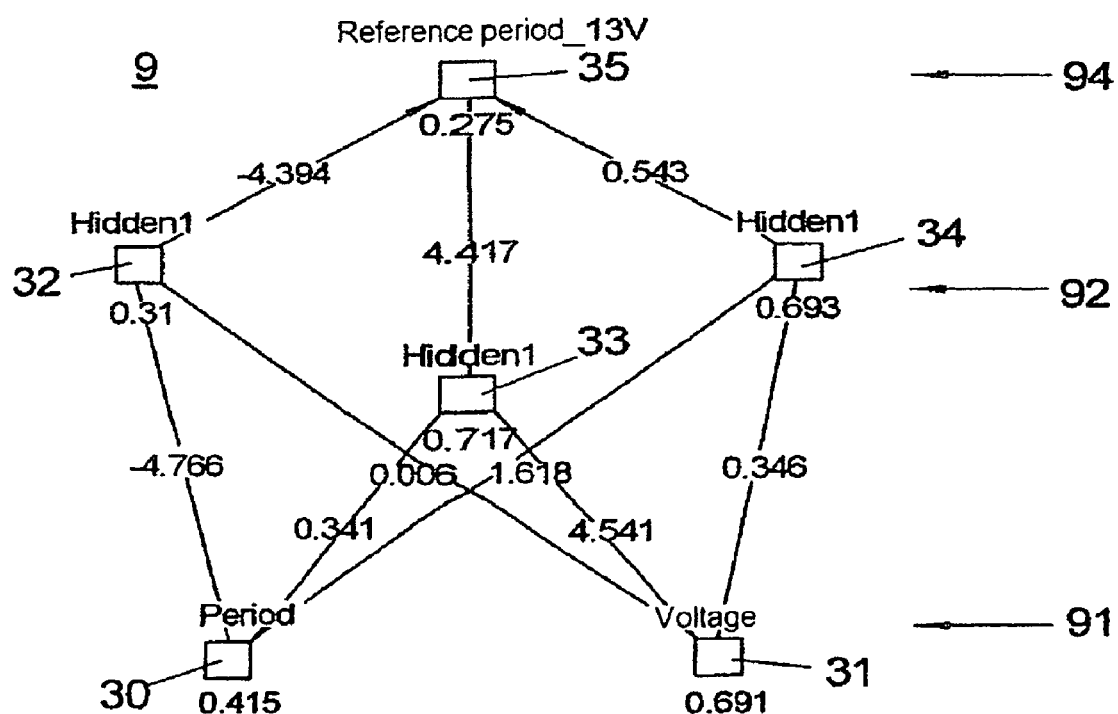
FIG. 14 illustrates the neural adaptation network according to FIG. 13 for determining a reference period for a drive motor voltage of 16 V.

FIGS. 13 and 14 show two examples of the determination of a reference period for motor voltages of 9 V and 16 V in order to demonstrate the precision of the neural adaptation network 9. At each torque, in each case the position-dependent adaptation value of the neural adaptation network is calculated as follows:

|  | Input 1 = period | Input 2 = voltage |
| --- | --- | --- |
| Case 1: 9 V | 0.946065 | 0.379684 |
| Case 2: 16 V | 0.415552 | 0.691795 |
| $Bias_1$ (connection neuron 32) | 1.17752 | |
| $Bias_1$ (connection neuron 33) | −2.35308 | |
| $Bias_1$ (connection neuron 34) | −0.09405 | |
| $Bias_1$ (output neuron) | −3.15073 | |

For example the logistic function is selected as a transfer function:

$$output_i = \frac{1}{1 + e^{-(sum_i + bias_i)}}$$

The sum of the first hidden neuron 32 is $Sum_1$=input 1*$weighting_{11}$+input 2*$weighting_{12}$+$bias_1$=0.946065*−4.766+0.379684*0.006+1.17752=−3.3291

The output value of the first hidden neuron 32 is thus $$output_i = \frac{1}{1 + e^{-(-3.3291)}} = 0.034586$$

This result is provided in a rounded form under the first hidden neuron 32 of the neural adaptation network illustrated in FIG. 13.

According to this procedure, the output values of the second and third hidden neurons 32, 34 and of the output neuron 35 can be calculated:

$Sum_2$=−0.3055108
$Output_2$=0.42421088
$SUM_3$=1.56893044
$Output_3$=0.82763108
$Sum_4$=−0.9786242
$Output_4$=0.27316486=result at 9 V In the same way it is possible to calculate the reference period for a motor voltage of 16 V with the neural adaptation network as follows $Sum_1$=−0.7989789
$Output_1$=0.31024398
$Sum_2$=0.93062225
$Output_2$=0.71720151
$Sum_3$=0.81829026
$Output_3$=0.69387329
$Sum_4$=−0.9684947
$Output_4$=0.27518065=result at 16 V The fault rate for the external voltage values presented above is:

$$1 - \frac{0.27518065}{0.27316486} = 0.73\%$$

The fault which would arise with the approximation $$\frac{n_1}{n_2} = \frac{U_1}{U_2}$$

would, depending on the drive motor, be between 10 and 15% compared to the latter.

In order to avoid incorrect reversing of the drive motor owing, for example, to changes in the adjusting force of the window lifter system or changes in the drive motor, the spring constant of a trapped object is taken into account as an additional criterion for the detection of a trapping process.

If the drive motor has, for example, a four-pole ring magnet, the difference in rotational speed between period zero and period four of the drive motor is determined and this value is logically combined with the output value of the neural network 6 corresponding to the adjusting force of the drive device, according to FIG. 2. The method of operation of this logic operation will be explained in more detail with reference to FIGS. 15 to 17.

Figure 15:
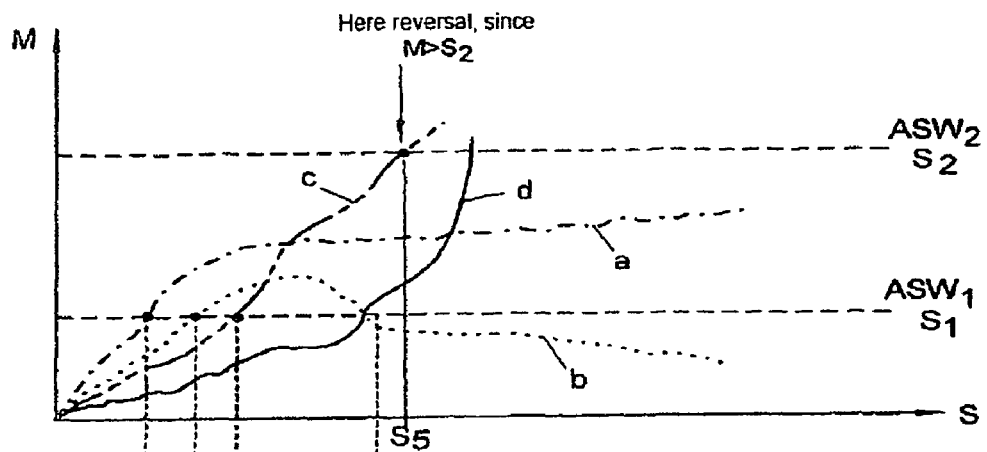
FIG. 15 is a schematic illustration of the torque profile over the adjustment travel for different sample passes of the drive device.
Figure 16:
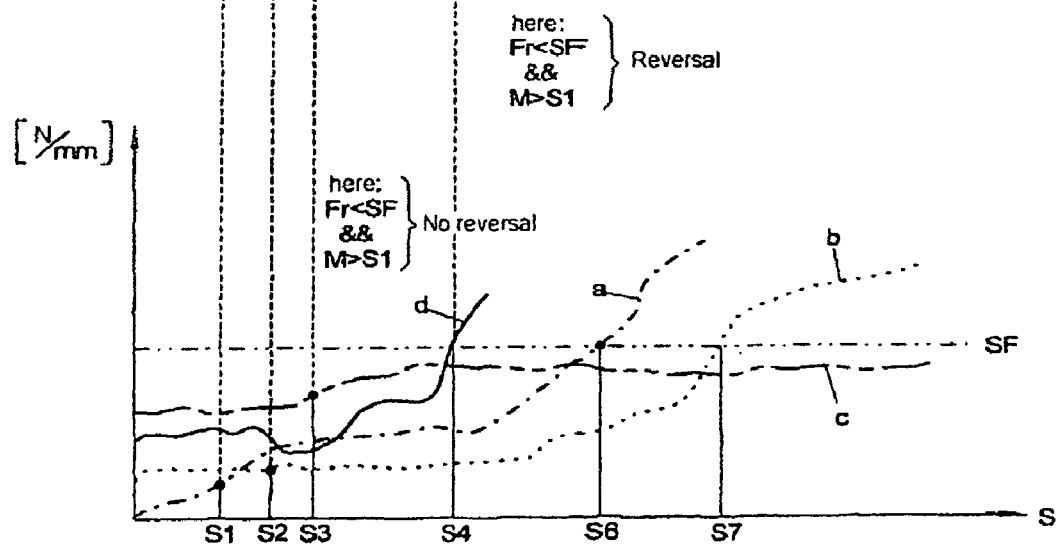
FIG. 16 is a schematic illustration of the difference in rotational speed over the adjustment travel for different sample passes of the drive device.

FIG. 15 shows the profile of the torque M plotted against the adjustment travel s for four different closing processes a to d, and FIG. 16 shows the profile of the spring constant Fr and of the difference in rotational speed of two comparison periods over the adjustment travel s for the closing movements (illustrated in FIG. 15) of a window pane 22 according to FIG. 1. The threshold value SF for the difference in rotational speed defines here the limit at which the low spring constants start and is, for example, 20 N/mm.

Predefining two switch-off value threshold values $ASW_1$ and $ASW_2$ of the output value of the neural network and of a threshold value SF for the difference in rotational speed allows the cases of reversing described below to be differentiated.

If the output value M of the neural network exceeds, after the adjustment travel $s_1$, the first switch-off threshold value $ASW_1$ according to the curve a and if the difference in rotational speed is smaller at this point than the predefined threshold value SF for the difference in rotational speed, the drive motor is not reversed even if in the further course the threshold value SF for the difference in rotational speed is, for example, exceeded after the adjustment travel $s_7$.

In this case, reversal of the drive motor is locked or blocked so that when the threshold value SF for the difference in rotational speed is exceeded in the further course of the adjustment travel, it is not possible for the drive motor to reverse. Only if the second switch-off threshold value S2 is exceeded during the further adjustment process does immediate reversal of the drive motor occur.

Only if the second switch-off threshold value $ASW_2$ which is greater than the first switch-off threshold value $ASW_1$, is exceeded during this path is the drive motor reversed.

The same criterion relates to the curve b which briefly exceeds the first switch-off threshold value $ASW_1$ after the adjustment travel $s_2$ and then drops again below the first switch-off threshold value $ASW_1$.

If the output value M of the neural network exceeds the first switch-off threshold value $ASW_1$ in accordance with the curve c during the adjustment travel $s_3$ during which the difference in rotational speed is also smaller than the threshold value SF for the difference in rotational speed, the drive motor is reversed immediately as soon as the second switch-off threshold value $ASW_2$ is exceeded at the point $s_5$.

If the output value M of the neural network exceeds the first switch-off threshold value $ASW_1$, in accordance with the curve d after the adjustment travel $s_4$ and if the difference in rotational speed is greater at this point than the threshold value SF for the difference in rotational speed, the drive motor is immediately reversed.

Figure 17:
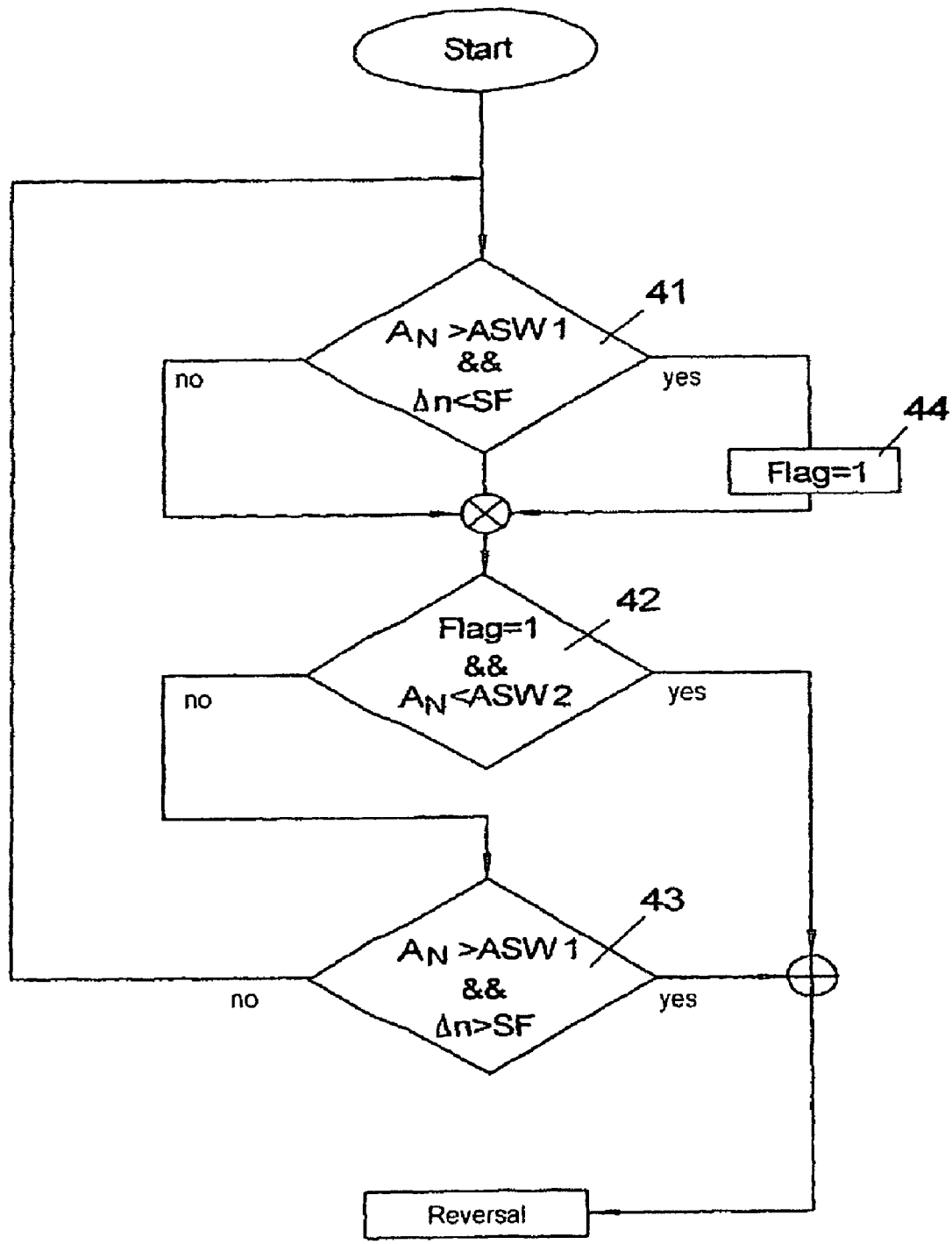
FIG. 17 is a flowchart relating to the logic combination of the output value corresponding to the adjusting force of the neural network with the sensed difference in rotational speed.

FIG. 17 illustrates the above switch-off criteria as a flow chart which, after the start of the program in a first decision block 41, compares the output value $A_N$ of the neural network with the first switch-off threshold value $ASW_1$, and compares the spring constant or difference in rotational speed with the threshold value SF for the difference in rotational speed. If the output value $A_N$ is greater than the first switch-off threshold value $ASW_1$ and the difference in rotational speed is smaller than the threshold value SF for the difference in rotational speed, a flag 44 is set and fed to a second decision block 42 while the program goes directly to the second decision block 42 when the above condition is not fulfilled.

In this second decision block 42, the condition is tested as to whether the flag 42 is set and the output value $A_N$ of the neural network is greater than the second switch-off threshold value $ASW_2$. If this AND logic operation applies, the drive motor is reversed immediately. On the other hand, if this condition is not met, in a third decision block 43 it is checked whether the output value $A_N$ of the neural network is greater than the first switch-off threshold value $ASW_1$ and the difference in rotational speed is greater than the threshold value SF for the difference in rotational speed. If this is the case, the drive motor is also reversed immediately. If this is not the case, the system jumps back again to the first decision block 41.

The logic combination of the determined spring constant with the output value of the neural network can either be carried out by means of a fuzzy system or by means of a mathematical model with a corresponding algorithm or likewise by means of a neural network to which, in the input layer, the output value corresponding to the adjusting force or the adjusting torque of the neural network according to FIG. 2 is fed and the determined difference in rotational speed is fed, said neural network outputting at its output layer a value which corresponds to a trapped or nontrapped state.

Figure 18A:
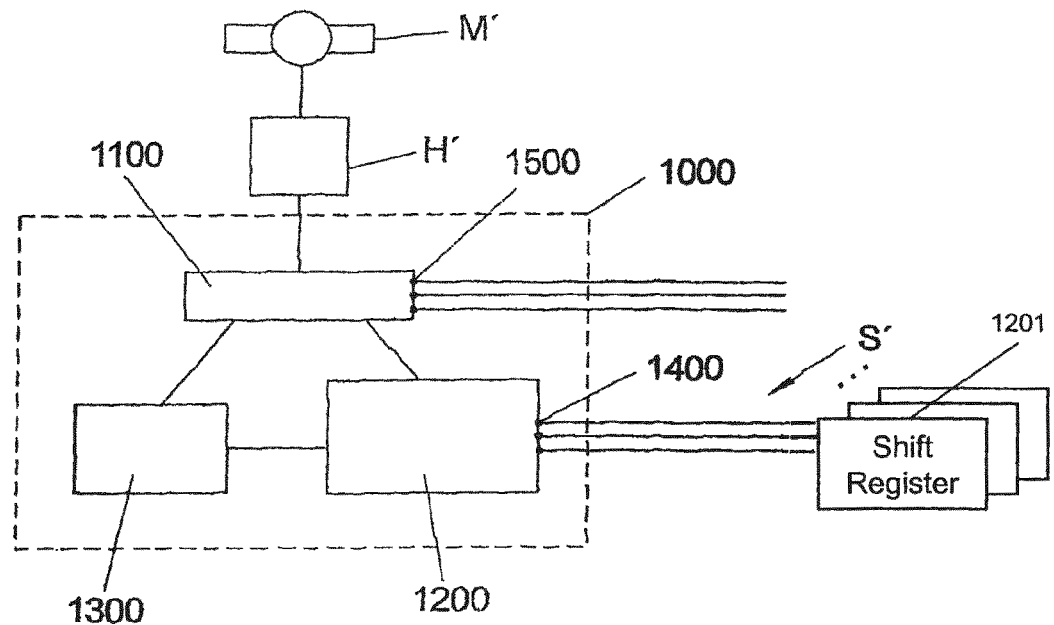
FIG. 18A shows the schematic block circuit diagram of a first embodiment of a control device with a neural network.

FIG. 18A shows the schematic block circuit diagram of a first embodiment of a control device with a neural network for an adjusting device of a motor vehicle component.

First, the design of the illustrated control device is described. The control device comprises an electronic device 1000. The latter has a microcontroller 1100, a component with a neural network 1200 and a storage element 1300. The microcontroller 1100 is connected both to the neural network 1200 and to the storage element 1300. The storage element 1300 interacts with the neural network 1200 via a line connection.

Both the microcontroller 1100 and the neural network 1200 have a multiplicity of interfaces 1400, 1500. The interfaces 1400 of the neural network 1200 serve as inputs for the measured variables S' to be evaluated. The interfaces 1400 feed the measured variables S to the input layer of the neural network 1200. One or more of these interfaces 1400 can be embodied as connections to a CAN bus system or LIN bus system of the motor vehicle.

In particular the signals of an acceleration sensor which characterizes the movement of the motor vehicle or of a motor vehicle component such as, for example, the door or the tailgate are suitable as measured variables S'. On the basis of these acceleration signals it is possible, for example, to identify unambiguously as a state the traveling of the vehicle over a section of poor road or the slamming movement of a door or of a tailgate. There is likewise provision for measured variables of a motor M' which is assigned to the adjusting device to be evaluated. The movement characteristic of electric motors can be monitored, for example, by means of Hall sensors. Evaluating these signals permits conclusions to be drawn about difficulties of movement and cases of trapping.

The interfaces 1500 of the microcontroller 1100 serve as inputs for signals from which the different states of the motor vehicle and its components can be read out. These are the same measured variables S or a subset of these measured variables S' which are fed to the neural network 1200 via the interfaces 1400.

The microcontroller 1100 controls a motor M' via a line connection using a power driver H'. This motor M' moves the motor vehicle component which is assigned to the adjusting device.

It goes without saying that the microcontroller 1100, the neural network 1200 and/or the storage element 1300 as the illustrated elements of the electronic device 1000 can also be configured as a physical unit in the form of an integrated circuit. The variant in which the neural network 1200 and storage element 1300 are integrated is shown as the schematic illustration of a second embodiment of the control device in FIG. 18B. The other components of this illustration correspond to those from FIG. 18A so that reference is made to the preceding statements.

Figure 18B:
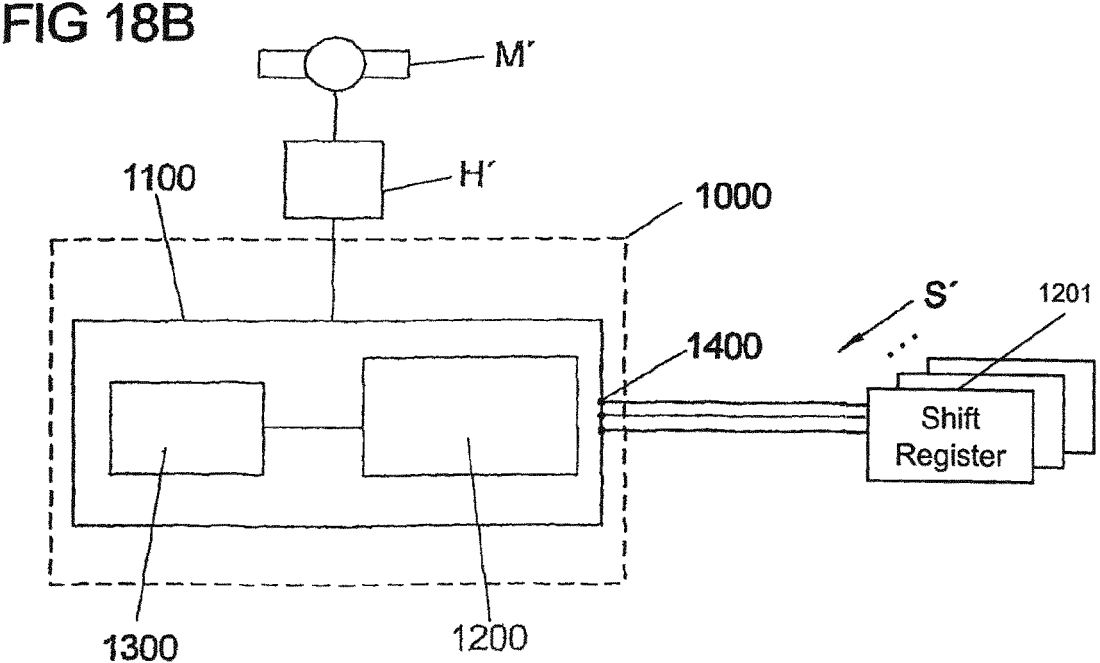
FIG. 18B shows the schematic block circuit diagram of a second embodiment of a control device with a neural network.

The technical implementation of the integration of a neural network into a microcontroller can, on the one hand, take the form of the neural network being implemented in the microcontroller as software. On the other hand it is also conceivable for the microcontroller to be implemented in the form of an ASIC (Applied Specific Integrated Circuit) structure. Of course, the storage element 1300 can also be implemented in the microcontroller, as shown in FIG. 18B. A conceivable variant (not illustrated) is one in which only the neural network 1200 is integrated in the microcontroller but not the storage element, which would then be implemented as a separate component of the electronic device.

What follows is concerned with the method of functioning of the control devices which are illustrated in FIGS. 18A and 18B. The microcontroller 1100 receives, via the interfaces 1400, 1500, the signals of the motor vehicle and of its components which inform it about their respective state. In the microcontroller 1100, the information as to which of the determined states the neural network 1200 should operate in with which sets of weightings is stored. If therefore the determined state of the vehicle and its components is changed in such a way that a different weighting set is required for the neural network 1200, the microcontroller initiates a process which makes available the corresponding set of weightings for the neural network 1200 from the storage element 1300. The neural network 1200 then operates with the new set of weightings until the microcontroller 1100 again registers a change in the state of the motor vehicle and/or its components which is such that renewed replacement of the set of weightings for the neural network becomes necessary.

The method of functioning described above is independent of whether the neural network 1200 is integrated as software or as an integrated hardware element of an ASIC design in the microcontroller 1100 or is provided as a separate electronic component.

The neural network 1200 implements the trapping prevention means for obstacles which become trapped in the adjustment travel of the motor vehicle component, independently of the currently active set of weightings.

In this way, the control system can preferably be configured in such a way that for specific states, for example when the vehicle travels over a section of poor road or a motor vehicle door is slammed, the neural network 1200 of the adjusting device mainly detects a restricted range of spring constants of the adjustable motor vehicle component. This can be achieved in that a significantly increased response threshold of the trapping prevention system implemented by means of the neural network 1200 is used for the other spring constants.

Figure 19:
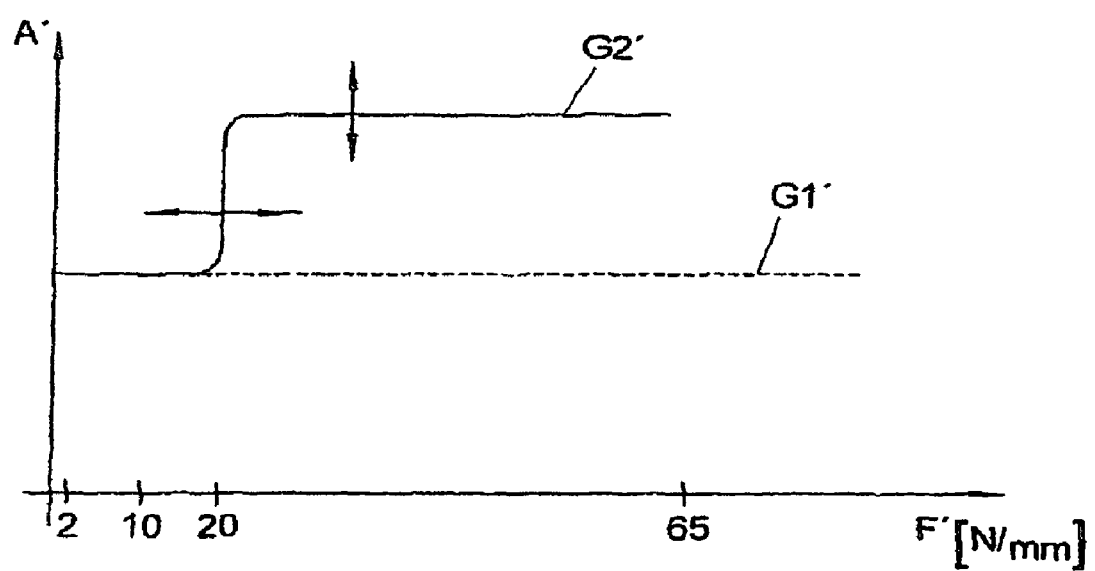
FIG. 19 is a schematic illustration of the variable response threshold of the control device in FIGS. 18a and 18b as a function of the detected spring constant of a motor vehicle component which is moved with the adjustment device.

This is illustrated schematically in FIG. 19. Here, the response threshold A' of the trapping prevention system of the adjusting device is plotted against the spring constant F'.

A first set of weightings G1' for the neural network 1200 has the same response threshold for all the spring constants F'. The line which is continuous and then dashed is intended to illustrate this.

A second set of weightings G2' has a significantly increased response threshold from a spring constant of approximately 20 N/mm. This set G2' would be used, for example, in the state in which a section of poor road is traveled over or when a motor vehicle door is slammed. It is clear that the absolute value of the increase in the response threshold and in the threshold value of the spring constant is freely adjustable, which the illustrated arrows are intended to indicate.

Furthermore, a method for controlling an adjusting device of a motor vehicle component with an electronic device which has a neural network is described. This method comprises the following steps:

evaluation of measured variables of the motor vehicle and/or of the adjusting device by means of the electronic device in order to determine a state of the motor vehicle and/or a state of the adjusting device;

selection of a set of weightings for the neural network from a multiplicity of sets of weightings as a function of the evaluation of the measured variables and of the determined state, and use of the selected set of weightings for operating the neural network while the adjusting device of the motor vehicle component is being controlled.

In this context, the neural network is preferably operated in such a way that it makes available a trapping prevention system for obstacles which become trapped in the adjustment travel of the motor vehicle component.

A microcontroller of the electronic device will preferably evaluate measured variables of the motor vehicle in order to determine states of the motor vehicle and/or of motor vehicle components. Depending on the determined state, the microcontroller will activate the set of weightings for the neural network which are assigned to this state.

The invention claimed is:

1. A method for monitoring an adjustment movement of a component in a motor vehicle, the component being driven by a drive device and being adjustable in a translatory or rotary fashion, the method comprising:
   inputting, at input neurons of an input layer of a neural network, a plurality of input signals being derived from the drive device and representing a deceleration of the adjustment movement of the drive device; and
   utilizing an adaptation device comprising an additional neural adaptation network;
   wherein the neural network comprises at least one hidden layer having hidden neurons and an output layer having at least one output neuron, said neural network outputting, at the at least one output neuron of the output layer, an output value corresponding to one of an adjusting force, a trapped state and a nontrapped state of the component;
   wherein the deceleration of the adjustment movement of the drive device is determined from a change in at least one of a period length, a motor current, and a motor voltage of a drive motor of the drive device;
   wherein the neural adaptation network calculates, from an actual period length at an actual motor voltage, a reference period length at a reference voltage, the reference period length being dependent on a position of the component being driven by the drive device; and
   wherein the neural adaptation network inputs the reference period length to an input neuron of the neural network as an additional input signal.

2. The method as claimed in claim 1, wherein the input signals being derived from the drive device indirectly represent the deceleration of the adjustment movement of the drive device.

3. The method as claimed in claim 1, wherein the input signals being derived from the drive device are input in parallel or in series to the input neurons of the input layer of the neural network.

4. The method as claimed in claim 1, wherein inputs of the input layer, of the at least one hidden layer and of the output layer as well as connections of the input layer to the at least one hidden layer, connections of a plurality of hidden layers to one another and connections of the at least one hidden layer to the output layer have differing weightings.

5. The method as claimed in claim 1, wherein the hidden neurons of the at least one hidden layer and the at least one output neuron of the output layer have one of constant threshold value and bias which shifts an output of transfer functions of the neurons of the at least one hidden layer and the output layer into a constant region.

6. The method as claimed in claim 1, wherein in a learning phase for at least one of the input neurons, the hidden neurons and the at least one output neuron of the neural network, the method further comprises:
   assigning random weightings;
   predefining various input patterns which are applied to the input neurons, and calculating the associated at least one output value; and changing at least one of the weightings and a threshold value as a function of a difference between the at least one output value and at least one target output value.

7. The method as claimed in claim 6, wherein a degree of change in the weightings depends on the magnitude of the difference between the at least one output value and the at least one target output value.

8. The method as claimed in claim 6 or 7, comprising measuring the output value with a clip-on force measuring instrument at different spring constants, wherein the clip-on force measuring instrument outputs the measured output value in an analogous manner to the input signals.

9. The method as claimed in claim 1, wherein at least one of a motor period, a motor current and a motor voltage of a drive motor of the drive device are input into the input neurons as the input signals.

10. The method as claimed in claim 1, wherein an adaptation period specifying a period calculated at a predefined reference voltage and being associated with a position on a reference travel path stored in a learning phase is input into the input neurons as an additional input signal.

11. The method as claimed in claim 10, wherein the adaptation period is averaged, wherein the neural network calculates a new adaptation period at one of each full rotation of a drive motor of the drive device and in four quarter periods of the drive motor, said new adaptation period being provided at a next adjustment movement as the adaptation period.

12. The method as claimed in claim 1, wherein the input signals of the input neurons comprise:
values of an adaptation profile of the component being adjustable in translatory fashion;
values of an adaptation period during the adjustment movement of the component being adjustable in translatory fashion;
a run-up flag;
output values of a shift register for terminal voltages of a drive motor of the drive device;
output values of a shift register for period values;
a temperature of the drive motor;
an ambient temperature;
a speed signal;
an oscillation voltage; and
a preceding output value;
wherein the adjusting force being determined by the neural network is output as the output value of the at least one output neuron.

13. The method as claimed in claim 1, wherein in a learning phase of the neural network, input patterns being applied to the input neurons and output values being output by the at least one output neuron are selected or predefined as a function of a desired sensitivity of a system comprising the drive device at low spring constants.

14. The method as claimed in claim 13, wherein in the learning phase of the neural network an adaptation period is, after each run, determined anew during operation of the drive device.

15. The method as claimed in claim 13 or 14, wherein the learning phase takes place in the vehicle before operational application.

16. The method as claimed in claim 15, wherein weightings of the neural network being determined in the learning phase are defined during the operational application.

17. The method as claimed in claim 1, wherein additional parameters comprising an ambient temperature, one of climatic data and a temperature and a cooling behavior of a drive motor of the drive device are applied to the input neurons of the neural adaptation network.

18. The method as claimed in claim 17, wherein the adaptation device comprises one of a model of the drive device, a fuzzy system and a mathematical model with a genetically generated algorithm.

19. The method as claimed claim 1, wherein a drive motor of the drive device is one of stopped and reversed as a function of the output value of the neural network and a spring constant.

20. The method as claimed in claim 19, wherein a logic combination of the spring constant of the drive device with the output value of the neural network is carried out by means of one of a logic circuit, a mathematical model with an algorithm and a neural logic network.

21. The method as claimed in claim 19 or 20, wherein a rotational speed of the drive motor is sensed, and the difference in rotational speed between two periods of the drive motor is formed and logically combined with the output value of the neural network in such a way that:
if a first switch-off threshold value of the output value of the neural network is exceeded and the difference in rotational speed is smaller than a predefined threshold value for the difference in rotational speed, the drive motor is one of stopped and reversed, up to the end of the adjustment movement, if and only if the output value of the neural network exceeds a second switch-off threshold value which is greater than the first switch-off threshold value;
if the first switch-off threshold value of the output value of the neural network is exceeded and the difference in rotational speed is greater than the predefined threshold value for the difference in rotational speed, the drive motor is one of stopped and reversed; and
if the second switch-off threshold value is exceeded, the drive motor is one of stopped and reversed irrespective of the difference in rotational speed.

22. The method as claimed in claim 21, wherein, if the first switch-off threshold value of the output value of the neural network is exceeded and the difference in rotational speed is smaller than the predefined threshold value for the difference in rotational speed, the one of stopping and reversing of the drive motor is blocked even if the difference in rotational speed during a further adjustment movement of the drive device becomes greater than the predefined threshold value for the difference in rotational speed.

23. The method as claimed in claim 1, further comprising:
evaluating the input signals by means of the neural network in order to determine at least one of a state of the motor vehicle and a state of an adjustment device comprising the drive device;
selecting a set of weightings for the neural network from a plurality of sets of weightings independent of the evaluation of the input signals and the determined state; and
using the selected set of weightings to operate the neural network while controlling the drive device for driving the adjustable component.

* * * * *